(12) United States Patent  
Zhang et al.

(10) Patent No.: US 12,174,347 B2  
(45) Date of Patent: Dec. 24, 2024

(54) OPTICAL IMAGING LENS

(71) Applicant: ZHEJIANG SUNNY OPTICS CO., LTD., Zhejiang (CN)

(72) Inventors: Shuang Zhang, Zhejiang (CN); Xiaobin Zhang, Zhejiang (CN); Jianke Wenren, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 743 days.

(21) Appl. No.: 17/314,074

(22) Filed: May 7, 2021

(65) Prior Publication Data

US 2021/0364755 A1    Nov. 25, 2021

(30) Foreign Application Priority Data

May 25, 2020   (CN) .......................... 202010458639.X

(51) Int. Cl.
   *G02B 13/00*   (2006.01)
   *G02B 9/64*    (2006.01)

(52) U.S. Cl.
   CPC ........... *G02B 13/0045* (2013.01); *G02B 9/64* (2013.01)

(58) Field of Classification Search
   CPC ....... G02B 13/0045; G02B 13/18; G02B 9/64
   See application file for complete search history.

(56) References Cited

U.S. PATENT DOCUMENTS

| | | | |
|---|---|---|---|
| 10,585,264 B2* | 3/2020 | Fang | G02B 3/04 |
| 2016/0282588 A1* | 9/2016 | Sekine | G02B 13/0045 |
| 2017/0227736 A1* | 8/2017 | Lai | G02B 9/62 |
| 2019/0121063 A1 | 4/2019 | Li et al. | |
| 2020/0209538 A1* | 7/2020 | Yamazaki | G02B 13/0045 |
| 2020/0241253 A1* | 7/2020 | Hsueh | G02B 27/0025 |
| 2020/0409071 A1* | 12/2020 | Xu | G02B 13/06 |
| 2020/0409074 A1* | 12/2020 | Oinuma | G02B 13/0045 |
| 2020/0409075 A1* | 12/2020 | Chen | G02B 7/102 |
| 2021/0263277 A1* | 8/2021 | Liu | G02B 9/64 |

FOREIGN PATENT DOCUMENTS

CN   109828359 A   *  5/2019   ......... G02B 13/0045

* cited by examiner

*Primary Examiner* — Nicholas R. Pasko
*Assistant Examiner* — Samanvitha Sridhar
(74) *Attorney, Agent, or Firm* — Samson G. Yu

(57) ABSTRACT

The disclosure discloses an optical imaging lens, which sequentially includes from an object side to an image side along an optical axis: a first lens has a positive refractive power; a second lens has a positive refractive power; a third lens, an object-side surface thereof is a concave surface, and an image-side surface thereof is a convex surface; a fourth lens; a fifth lens has a positive refractive power; a sixth lens has a negative refractive power; TTL is a distance from an object-side surface of the first lens to an imaging surface of the optical imaging lens on the optical axis, ImgH is a half the diagonal length of an effective pixel area on the imaging surface of the optical imaging lens, and TTL and ImgH satisfy TTL/ImgH<1.3; and TTL satisfies TTL<5.0 mm.

12 Claims, 18 Drawing Sheets

OPTICAL IMAGING LENS

CROSS-REFERENCE TO RELATED PRESENT INVENTION(S)

The disclosure claims priority to and the benefit of Chinese Patent Present invention No. 202010458639.X, filed in the China National Intellectual Property Administration (CNIPA) on 25 May 2020, which is incorporated herein by reference in its entirety.

TECHNICAL FIELD

The disclosure relates to the field of optical elements, and more particularly to an optical imaging lens.

BACKGROUND

In recent years, shooting functions of mobile phones have been constantly improved. However, users of mobile phones are still pursuing better shooting experiences. Users not only require relatively high resolutions but also expect to achieve good shooting effects. And then shooting effects reflecting camera functions of mobile phones also become highlights emphasized by manufacturers of the mobile phones when promoting the mobile phones.

Camera modules are usually arranged in portable devices such as mobile phones to endow the mobile phones with camera functions. In a camera module, a Charge-Coupled Device (CCD) type image sensor or a Complementary Metal Oxide Semiconductor (CMOS) type image sensor is usually arranged, and an optical imaging lens is also arranged. The optical imaging lens may converge light of an object side, imaged light follows a light path of the optical imaging lens and irradiates the image sensor, and then the image sensor converts an optical signal into an electric signal to form image data.

For achieving a better shooting effect of a mobile phone to provide a better shooting experience for a user, an optical imaging lens capable of meeting a miniaturization requirement and with a large aperture, a large image surface and a wide-angle characteristic is required.

SUMMARY

Some embodiments of the disclosure provide an optical imaging lens applicable to a portable electronic product and capable of at least overcoming or partially overcoming at least one shortcoming above in a conventional art.

One embodiment of the disclosure provides an optical imaging lens, which sequentially includes from an object side to an image side along an optical axis: a first lens has a positive refractive power; a second lens has a positive refractive power; a third lens, an object-side surface thereof may be a concave surface, and an image-side surface thereof may be a convex surface; a fourth lens; a fifth lens has a positive refractive power; and a sixth lens has a negative refractive power; TTL is a distance from an object-side surface of the first lens to an imaging surface of the optical imaging lens on the optical axis, ImgH is a half the diagonal length of an effective pixel area on the imaging surface of the optical imaging lens, TTL and ImgH may satisfy TTL/ImgH<1.3; and TTL may satisfy TTL<5.0 mm.

In an implementation mode, an object-side surface of the first lens to an image-side surface of the sixth lens includes at least one aspherical mirror surface.

In an implementation mode, ImgH is a half the diagonal length of an effective pixel area on the imaging surface of the optical imaging lens, and ImgH and a total effective focal length f of the optical imaging lens may satisfy 1.0<ImgH/f<1.3.

In an implementation mode, an effective focal length f1 of the first lens, an effective focal length f2 of the second lens and an effective focal length f5 of the fifth lens may satisfy 1.0<f2/(f1+f5)<1.6.

In an implementation mode, an effective focal length f3 of the third lens, a curvature radius R5 of the object-side surface of the third lens and a curvature radius R6 of the image-side surface of the third lens may satisfy 0.1<f3/(R5+R6)<1.4.

In an implementation mode, an effective focal length f6 of the sixth lens and a curvature radius R12 of an image-side surface of the sixth lens may satisfy −2.9<f6/R12<−1.8.

In an implementation mode, a spacing distance T34 of the third lens and the fourth lens on the optical axis and a center thickness CT3 of the third lens on the optical axis may satisfy 0.3<T34/CT3<0.7.

In an implementation mode, a center thickness CT5 of the fifth lens on the optical axis, a spacing distance T56 of the fifth lens and the sixth lens on the optical axis and a center thickness CT6 of the sixth lens on the optical axis may satisfy 0.8<CT5/(T56+CT6)<1.3.

In an implementation mode, an effective semi-diameter DT12 of an image-side surface of the first lens and an effective semi-diameter DT32 of the image-side surface of the third lens may satisfy 0.6<DT12/DT32<0.8.

In an implementation mode, a combined focal length f23 of the second lens and the third lens and an effective focal length f4 of the fourth lens may satisfy −1.8<f23/f4<−1.4.

In an implementation mode, an center thickness CT5 of the fifth lens on the optical axis and an edge thickness ET5 of the fifth lens may satisfy 2.2<CT5/ET5<2.7.

In an implementation mode, SAG31 is an on-axis distance from an intersection point of the object-side surface of the third lens and the optical axis to an effective radius vertex of an effective semi-diameter of the object-side surface of the third lens, and SAG32 is an on-axis distance from an intersection point of the image-side surface of the third lens and the optical axis to an effective radius vertex of an effective semi-diameter of the image-side surface of the third lens, SAG31, SAG32 and a total effective focal length f of the optical imaging lens may satisfy −1.4<(SAG31+SAG32)/f×10<−0.9.

In an implementation mode, a total effective focal length f of the optical imaging lens and an entrance pupil diameter (EPD) of the optical imaging lens may satisfy 1.8<f/EPD<2.2.

Another embodiment of the disclosure provides an optical imaging lens, which sequentially includes from an object side to an image side along an optical axis: a first lens has a positive refractive power; a second lens has a positive refractive power; a third lens, an object-side surface thereof is a concave surface, and an image-side surface is a convex surface; a fourth lens; a fifth lens has a positive refractive power; a sixth lens has a negative refractive power, TTL is a distance from an object-side surface of the first lens to an imaging surface of the optical imaging lens on the optical axis, ImgH is a half the diagonal length of an effective pixel area on the imaging surface of the optical imaging lens, TTL and ImgH may satisfy TTL/ImgH<1.3; and an effective focal length f1 of the first lens, an effective focal length f2 of the second lens and an effective focal length f5 of the fifth lens may satisfy 1.0<f2/(f1+f5)<1.6.

In an implementation mode, ImgH is a half the diagonal length of an effective pixel area on the imaging surface of the optical imaging lens, ImgH and a total effective focal length f of the optical imaging lens may satisfy 1.0<ImgH/f<1.3.

In an implementation mode, TTL is a distance from an object-side surface of the first lens to an imaging surface of the optical imaging lens on the optical axis, TTL may satisfy TTL<5.0 mm.

In an implementation mode, an effective focal length f3 of the third lens, a curvature radius R5 of the object-side surface of the third lens and a curvature radius R6 of the image-side surface of the third lens may satisfy 0.1<f3/(R5+R6)<1.4.

In an implementation mode, an effective focal length f6 of the sixth lens and a curvature radius R12 of an image-side surface of the sixth lens may satisfy −2.9<f6/R12<−1.8.

In an implementation mode, a spacing distance T34 of the third lens and the fourth lens on the optical axis and a center thickness CT3 of the third lens on the optical axis may satisfy 0.3<T34/CT3<0.7.

In an implementation mode, a center thickness CT5 of the fifth lens on the optical axis, a spacing distance T56 of the fifth lens and the sixth lens on the optical axis and a center thickness CT6 of the sixth lens on the optical axis may satisfy 0.8<CT5/(T56+CT6)<1.3.

In an implementation mode, an effective semi-diameter DT12 of an image-side surface of the first lens and an effective semi-diameter DT32 of the image-side surface of the third lens may satisfy 0.6<DT12/DT32<0.8.

In an implementation mode, a combined focal length f23 of the second lens and the third lens and an effective focal length f4 of the fourth lens may satisfy −1.8<f23/f4<−1.4.

In an implementation mode, a center thickness CT5 of the fifth lens on the optical axis and an edge thickness ET5 of the fifth lens may satisfy 2.2<CT5/ET5<2.7.

In an implementation mode, SAG31 is an on-axis distance from an intersection point of the object-side surface of the third lens and the optical axis to an effective radius vertex of an effective semi-diameter of the object-side surface of the third lens, and SAG32 is an on-axis distance from an intersection point of the image-side surface of the third lens and the optical axis to an effective radius vertex of an effective semi-diameter of the image-side surface of the third lens, SAG31, SAG32 and a total effective focal length f of the optical imaging lens may satisfy −1.4<(SAG31+SAG32)/f×10<−0.9.

In an implementation mode, a total effective focal length f of the optical imaging lens and an entrance pupil diameter (EPD) of the optical imaging lens may satisfy 1.8<f/EPD<2.2.

According to the disclosure, the six lenses are adopted, and the refractive power and surface types of each lens, the center thickness of each lens, spacing distances on the optical axis between the lenses and the like are reasonably configured to achieve at least one beneficial effect of large image surface, wide angle, large aperture and the like of the optical imaging lens. When scenery is shot, the optical imaging lens may accommodate more scenery, so that a shot picture looks grand. When a portrait is shot, an effect of proportionally compressing a background and highlighting the portrait may be presented, so that the portrait is displayed finely, and meanwhile, a "long-leg" effect may also be presented.

BRIEF DESCRIPTION OF THE DRAWINGS

Detailed descriptions are made to unrestrictive implementation modes below in combination with the drawings to make other features, objectives and advantages of the disclosure more apparent. In the drawings.

DETAILED DESCRIPTION OF THE EMBODIMENTS

Figure 1:
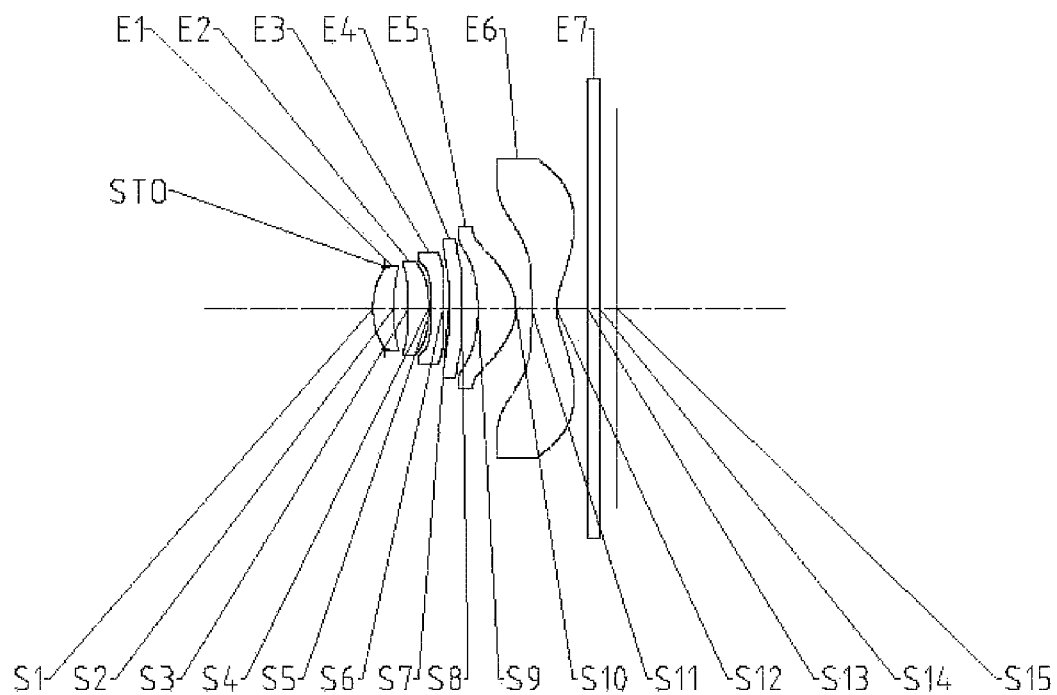
FIG. 1 shows a structural schematic diagram of an optical imaging lens according to Embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspherical shape shown in the drawings is shown by some embodiments. That is, the spherical shape or the aspherical shape is not limited to the spherical shape or aspherical shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An optical imaging lens according to the exemplary embodiment of the disclosure may include, for example, six lenses having refractive power, i.e., a first lens, a second lens, a third lens, a fourth lens, a fifth lens and a sixth lens. The six lenses are sequentially arranged from an object side to an image side along an optical axis. In the first lens to the sixth lens, there may be an air space between any two adjacent lenses.

In an exemplary embodiment, the first lens may have a positive refractive power; the second lens may have a positive refractive power; the third lens may have a positive refractive power or negative refractive power, an object-side surface thereof may be a concave surface, and an image-side surface thereof may be a convex surface; the fourth lens may have a positive refractive power or negative refractive power; the fifth lens may have a positive refractive power; and the sixth lens may have a negative refractive power. The first lens and the second lens having the positive refractive power act to converge light. The optical imaging lens is provided with the third lens of which the object-side surface is a concave surface and the image-side surface is a convex surface, so that light may be transmitted smoothly, and enlargement of an image surface is facilitated. Meanwhile, the first three lenses may be combined to facilitate reduction of a spherical aberration and chromatic aberration of the optical imaging lens. Through the fifth lens having the positive refractive power, light passing through the fourth lens may be further converged, furthermore, a field curvature, astigmatism and distortion of the optical imaging lens may be reduced, and an aberration of the optical imaging lens may be balanced. In addition, with arrangement of the sixth lens having the negative refractive power, the image surface of the optical imaging lens may be enlarged, meanwhile, reduction of a focal length of the optical imaging lens is facilitated, and effects of large image surface and large field of view of the optical imaging lens are finally achieved.

In an exemplary embodiment, the optical imaging lens of the disclosure may satisfy a conditional expression $TTL/ImgH<1.3$, wherein TTL is a distance from an object-side surface of the first lens to an imaging surface of the optical imaging lens on the optical axis, ImgH is a half diagonal length of an effective pixel area on the imaging surface of the optical imaging lens. Controlling $TTL/ImgH<1.3$ may reduce a ratio of a total track length of the optical imaging lens to a size of the image surface. More specifically, TTL and ImgH may satisfy $1.10<TTL/ImgH<1.25$.

In an exemplary embodiment, the optical imaging lens of the disclosure may satisfy a conditional expression $TTL<5.0$ mm, wherein TTL is a distance from an object-side surface of the first lens to an imaging surface of the optical imaging lens on the optical axis. Controlling $TTL<5.0$ mm is favorable for achieving the effect of ultrathin design of the optical imaging lens. More specifically, TTL may satisfy $TTL<4.4$ mm.

In an exemplary embodiment, the optical imaging lens of the disclosure may satisfy the conditional expressions $TTL<ImgH<1.3$ and $TTL<5.0$ mm. Such a setting manner is more favorable for achieving the characteristic of small size of the optical imaging lens.

In an exemplary embodiment, the optical imaging lens of the disclosure may satisfy a conditional expression $1.0<ImgH/f<1.3$, wherein ImgH is a half diagonal length of the effective pixel area on the imaging surface of the optical imaging lens, and f is a total effective focal length of the optical imaging lens. The conditional expression $1.0<ImgH/f<1.3$ is met, so that a field of view of the optical imaging lens may be enlarged, furthermore, the optical imaging lens may accommodate more scenery during shooting, and the generated picture has more hierarchical sense. More specifically, ImgH and f may satisfy $1.1<ImgH/f<1.2$.

In an exemplary embodiment, the optical imaging lens of the disclosure may satisfy a conditional expression $1.0<f2/(f1+f5)<1.6$, wherein f1 is an effective focal length of the first lens, f2 is an effective focal length of the second lens, and f5 is an effective focal length of the fifth lens. A relationship between the effective focal length of the second lens, the effective focal length of the first lens and the effective focal length of the fifth lens may be restricted to implement reasonable configuration of the refractive power of the optical imaging lens and further structurally balance the optical imaging lens. More specifically, f1, f2 and f5 may satisfy $1.15<f2/(f1+f5)<1.56$.

In an exemplary embodiment, the optical imaging lens of the disclosure may satisfy a conditional expression $0.1<f3/(R5+R6)<1.4$, wherein f3 is an effective focal length of the third lens, R5 is a curvature radius of the object-side surface of the third lens, and R6 is a curvature radius of the image-side surface of the third lens. The conditional expression $0.1<f3/(R5+R6)<1.4$ is met, so that a structure of the third lens may be controlled, a shape of the lens may be restricted, and furthermore, optimization of a spherochromatic aberration of the optical imaging lens is facilitated. More specifically, f3, R5 and R6 may satisfy $0.15<f3/(R5+R6)<1.36$.

In an exemplary embodiment, the optical imaging lens of the disclosure may satisfy a conditional expression $-2.9<f6/R12<-1.8$, wherein f6 is an effective focal length of the sixth lens, and R12 is a curvature radius of an image-side surface of the sixth lens. A ratio of the effective focal length of the sixth lens to the curvature radius of the image-side surface thereof is in this range, so that a shape of the sixth lens may be controlled, and reduction of the focal length of the optical imaging lens, enlargement of the field of view of the optical imaging lens and optimization of a field curvature of the optical imaging lens in an outer field of view are facilitated.

In an exemplary embodiment, the optical imaging lens of the disclosure may satisfy a conditional expression $0.3<T34/CT3<0.7$, wherein T34 is a spacing distance of the third lens and the fourth lens on the optical axis, and CT3 is a center thickness of the third lens on the optical axis. Controlling a ratio of an air space of the third lens and the fourth lens on the optical axis to the center thickness of the third lens in this range is favorable for reducing the gap sensitivity and center thickness sensitivity of the optical imaging lens. More specifically, T34 and CT3 may satisfy $0.45<T34/CT3<0.62$.

In an exemplary embodiment, the optical imaging lens of the disclosure may satisfy a conditional expression $0.8<CT5/(T56+CT6)<1.3$, wherein CT5 is a center thickness of the fifth lens on the optical axis, T56 is a spacing distance of the fifth lens and the sixth lens on the optical axis, and CT6 is a center thickness of the sixth lens on the optical axis. Controlling the center thicknesses of the fifth lens and the sixth lens and an air space of the fifth lens and the sixth lens on the optical axis to satisfy the conditional expression $0.8<CT5/(T56+CT6)<1.3$ may be favorable for reducing the element sensitivity of the fifth lens and the element sensitivity of the sixth lens and reducing strength of a ghost image generated by the sixth lens. More specifically, CT5, T56 and CT6 may satisfy $0.90<CT5/(T56+CT6)<1.25$.

In an exemplary embodiment, the optical imaging lens of the disclosure may satisfy a conditional expression $0.6<DT12/DT32<0.8$, wherein DT12 is an effective semi-diameter of an image-side surface of the first lens, and DT32 is an effective semi-diameter of the image-side surface of the third lens. Controlling a ratio of the effective semi-diameter of the image-side surface of the first lens to the effective semi-diameter of the image-side surface of the third lens in this range is favorable for reducing segment gaps between the first three lenses and reducing the assembling sensitivity of the first three lenses and may also reduce a size of a head of the optical imaging lens. More specifically, DT12 and DT32 may satisfy $0.70<DT12/DT32<0.79$.

In an exemplary embodiment, the optical imaging lens of the disclosure may satisfy a conditional expression $-1.8<f23/f4<-1.4$, wherein f23 is a combined focal length of the second lens and the third lens, and f4 is an effective focal length of the fourth lens, Restricting a ratio of the combined focal length of the second lens and the third lens to the effective focal length of the fourth lens in this range is favorable for balancing the refractive power of the optical imaging lens, meanwhile, may further eliminate the chromatic aberration and spherical aberration of the optical imaging lens and facilitates correction of the astigmatism of the optical imaging lens. More specifically, f23 and f4 may satisfy $-1.73<f23/f4<-1.41$.

In an exemplary embodiment, the optical imaging lens of the disclosure may satisfy a conditional expression $2.2<CT5/ET5<2.7$, where CT5 is a center thickness of the fifth lens on the optical axis, and ET5 is an edge thickness of the fifth lens. Controlling a ratio of the center thickness and edge thickness of the fifth lens is favorable for improving a shape of the fifth lens and machining and forming the fifth lens and may also reduce a stress after the fifth lens is formed to further facilitate improvement of a ring ghost image generated by reflection in the fifth lens. More specifically, CT5 and ET5 may satisfy $2.40<CT5/ET5<2.65$.

In an exemplary embodiment, the optical imaging lens of the disclosure may satisfy a conditional expression $-1.4<(SAG31+SAG32)/f\times10<-0.9$, wherein SAG31 is an on-axis distance from an intersection point of the object-side surface of the third lens and the optical axis to an effective radius vertex of the object-side surface of the third lens, and SAG32 is an on-axis distance from an intersection point of the image-side surface of the third lens and the optical axis to an effective radius vertex of the image-side surface of the third lens, and f is a total effective focal length. The two mirror surfaces of the third lens and the total effective focal length of the optical imaging lens may be controlled to satisfy the relationship to improve the shape of the third lens to facilitate divergent transmission of imaged light that passes through the third lens and further facilitate enlargement of the image surface. Exemplarily, in combination with the second lens having the positive refractive power, the aberration of the optical imaging lens may further be corrected. More specifically, SAG31, SAG32 and f may satisfy $-1.20<(SAG31+SAG32)/f\times10<-0.99$.

In an exemplary embodiment, the optical imaging lens of the disclosure may satisfy a conditional expression $1.8<f/EPD<2.2$, wherein f is a total effective focal length of the optical imaging lens, and EPD is an entrance pupil diameter of the optical imaging lens. A ratio of the total effective focal length to the EPD may be controlled in this range to enlarge an aperture, enhance an exposure, reduce a depth of field and improve the quality of a picture. More specifically, f and EPD may satisfy $1.82<f/EPD<2.14$.

In an exemplary embodiment, the optical imaging lens may further include at least one diaphragm. The diaphragm may be arranged at a proper position as required, for example, arranged between the object side and the first lens. Optionally, the optical imaging lens may further include an optical filter configured to correct the chromatic aberration and/or a protective glass configured to protect a photosensitive element on the imaging surface.

The optical imaging lens according to the above-described embodiment of the disclosure may adopt multiple lenses, for example, the abovementioned six. The refractive power and surface types of each lens, the center thickness of each lens, spacing distances on the optical axis between the lenses and the like are reasonably configured to effectively reduce the size of the imaging lens, reduce the sensitivity of the imaging lens, improve the machinability of the imaging lens and ensure that the optical imaging lens is more favorable for production and machining and applicable to a portable electronic product. For example, the optical imaging lens according to the above-described embodiment of the disclosure may be used as a front camera of a mobile phone. In addition, the optical imaging lens of the disclosure may also have high optical performance of large image surface, large aperture, wide angle, etc.

In the embodiment of the disclosure, at least one of the mirror surfaces of each lens is an aspherical mirror surface, namely at least one of an object-side surface of the first lens to an image-side surface of the sixth lens is an aspherical mirror surface. The aspherical lens has the features that a curvature keeps changing from a center of the lens to a periphery of the lens. Unlike a spherical lens with a constant curvature from a center of the lens to a periphery of the lens, the aspherical lens has a better curvature radius characteristic and the advantages of improving distortions and improving astigmatic aberrations. With adoption of the aspherical lens, aberration during imaging may be eliminated as much as possible, thereby improving the imaging quality. Optionally, at least one of the object-side surface and the image-side surface of each of the first lens, the second lens, the third lens, the fourth lens, the fifth lens and the sixth lens is an aspherical mirror surface. Optionally, both the object-side surface and the image-side surface of each of the first lens, the second lens, the third lens, the fourth lens, the fifth lens and the sixth lens are aspherical mirror surfaces.

However, those skilled in the art should know that the number of the lenses forming the optical imaging lens may be changed without departing from the technical solutions claimed in the disclosure to achieve each result and advantage described in the specification. For example, although descriptions are made in the implementation with six lenses as an example, the optical imaging lens is not limited to six lenses. If necessary, the optical imaging lens may further include another number of lenses.

Specific embodiments applied to the optical imaging lens of the abovementioned embodiments will further be described below with reference to the drawings.

Embodiment 1

An optical imaging lens according to Embodiment 1 of the disclosure will be described below with reference to FIGS. 1-2D. FIG. 1 shows a structural schematic diagram of an optical imaging lens according to Embodiment 1 of the disclosure.

As shown in FIG. 1, the optical imaging lens sequentially includes from an object side to an image side along an optical axis: a diaphragm STO, a first lens E1, a second lens E2, a third lens E3, a fourth lens E4, a fifth lens E5 and a sixth lens E6.

The first lens E1 has a positive refractive power, an object-side surface S1 thereof is a convex surface, and an image-side surface S2 thereof is a concave surface. The second lens E2 has a positive refractive power, an object-side surface S3 thereof is a concave surface, and an image-side surface S4 thereof is a convex surface. The third lens E3 has a negative refractive power, an object-side surface S5 thereof is a concave surface, and an image-side surface S6 thereof is a convex surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a concave surface, and an image-side surface S10 thereof is a convex surface. The sixth lens E6 has a negative refractive power, an object-side surface S11 thereof is a concave surface, and an image-side surface S12 thereof is a concave surface. An optical filter E7 has an object-side surface S13 and an image-side surface S14. The optical imaging lens has an imaging surface S15. Light from an object sequentially penetrates through each of the surfaces S1 to S14 and is finally imaged on the imaging surface S15.

Table 1 shows a table of basic parameters for the optical imaging lens of Embodiment 1, wherein the units of the curvature radius, the thickness/distance and the focal length are all millimeters (mm).

TABLE 1

| Surface number | Surface type | Curvature radius | Thickness/ distance | Refractive index | Abbe number | Focal length | Conic coefficient |
|---|---|---|---|---|---|---|---|
| OBJ | Spherical | Infinite | 350.0000 | | | | |
| STO | Spherical | Infinite | −0.2184 | | | | |
| S1 | Aspherical | 1.3784 | 0.3656 | 1.55 | 56.1 | 4.43 | −3.0731 |
| S2 | Aspherical | 2.9084 | 0.2614 | | | | 9.0011 |
| S3 | Aspherical | −10.6170 | 0.3641 | 1.55 | 56.1 | 8.37 | −6.7236 |
| S4 | Aspherical | −3.2344 | 0.0401 | | | | 0.0000 |
| S5 | Aspherical | −7.5411 | 0.2154 | 1.68 | 19.2 | −12.72 | 0.0000 |
| S6 | Aspherical | −61.1691 | 0.1002 | | | | 89.8845 |
| S7 | Aspherical | 6.3609 | 0.2294 | 1.67 | 20.4 | −16.23 | −82.6930 |
| S8 | Aspherical | 3.9489 | 0.2931 | | | | 0.0000 |
| S9 | Aspherical | −2.7529 | 0.6771 | 1.55 | 56.1 | 1.83 | 0.0000 |
| S10 | Aspherical | −0.7961 | 0.2761 | | | | −1.0000 |
| S11 | Aspherical | −103.4599 | 0.4449 | 1.54 | 55.7 | −1.79 | −81.9805 |
| S12 | Aspherical | 0.9708 | 0.5546 | | | | −4.5970 |
| S13 | Spherical | Infinite | 0.2165 | 1.52 | 64.2 | | |
| S14 | Spherical | Infinite | 0.3023 | | | | |
| S15 | Spherical | Infinite | | | | | |

In Embodiment 1, a value of a total effective focal length f of the optical imaging lens is 3.11 mm, TTL is a distance from an object-side surface S1 of the first lens E1 to an imaging surface S15 of the optical imaging lens on the optical axis, and a value of TTL is 4.34 mm, and ImgH is a half the diagonal length of an effective pixel area on the imaging surface S15 of the optical imaging lens, and a value of ImgH is 3.52 mm.

In Embodiment 1, both the object-side surface and the image-side surface of any one of the first lens E1 to the sixth lens E6 are aspherical surfaces, and the surface type x of each aspherical lens may be defined through, but not limited to, the following aspherical surface formula:

$$x = \frac{ch^2}{1+\sqrt{1-(k+1)c^2h^2}} + \sum A_i h^i, \tag{1}$$

wherein x is a vector height of a distance between the aspherical surface and a vertex of the aspherical surface when the aspherical surface is located at a position with the height h along the optical axis direction; c is a paraxial curvature of the aspherical surface, c=1/R (namely, the paraxial curvature c is the reciprocal of curvature radius R in Table 1 above); k is a conic coefficient; and Ai is a correction coefficient of the i-th order of the aspherical surface. Table 2 shows high-order coefficients $A_4$, $A_6$, $A_8$, $A_{10}$, $A_{12}$, $A_{14}$, $A_{16}$, $A_{18}$ and $A_{20}$ applied to each of the aspherical mirror surfaces S1-S12 in Embodiment 1.

TABLE 2

| Surface number | A4 | A6 | A8 | A10 | A12 | A14 |
|---|---|---|---|---|---|---|
| S1 | 1.0532E−01 | 2.7705E+00 | −6.9130E+01 | 1.0710E+03 | −1.0978E+04 | 7.7547E+04 |
| S2 | −1.2817E−02 | −1.4475E+00 | 4.3171E+01 | −7.9637E+02 | 9.5134E+03 | −7.7332E+04 |
| S3 | −1.6596E−01 | 5.7156E−01 | −8.9940E+00 | 7.7086E+01 | −4.2486E+02 | 1.5277E+03 |
| S4 | 7.6586E−02 | −4.3324E+00 | 3.6779E+01 | −2.6167E+02 | 1.4232E+03 | −5.5567E+03 |
| S5 | 2.8285E−01 | −2.3374E+00 | −8.7673E+00 | 2.6255E+02 | −2.6631E+03 | 1.6984E+04 |
| S6 | 1.8787E−01 | −1.1636E+00 | 6.0042E+00 | −3.1480E+01 | 1.2060E+02 | −3.1422E+02 |
| S7 | −4.1525E−01 | 1.5226E−01 | 1.4712E+00 | −7.0485E+00 | 1.6814E+01 | −1.7213E+01 |
| S8 | −4.2901E−01 | 7.4381E−01 | −4.0672E+00 | 2.2259E+01 | −8.7618E+01 | 2.4062E+02 |
| S9 | −2.4096E−02 | 1.9979E−01 | −1.2951E+00 | 4.2339E+00 | −8.6359E+00 | 1.0815E+01 |
| S10 | 3.5579E−01 | −8.1451E−01 | 1.6534E+00 | −1.8833E+00 | −2.5587E+00 | 1.6720E+01 |
| S11 | 1.2309E−02 | −3.2988E−01 | 4.4035E−01 | −1.5366E−01 | −3.0433E−01 | 5.1499E−01 |
| S12 | −1.2292E−01 | 8.3489E−02 | −6.9623E−02 | 6.9575E−02 | −5.7899E−02 | 3.3870E−02 |

| Surface number | A16 | A18 | A20 |
|---|---|---|---|
| S1 | −3.8716E+05 | 1.3846E+06 | −3.5554E+06 |
| S2 | 4.4056E+05 | −1.7872E+06 | 5.1832E+06 |
| S3 | −3.5740E+03 | 5.2376E+03 | −4.3649E+03 |
| S4 | 1.5255E+04 | −2.9102E+04 | 3.7726E+04 |
| S5 | −7.4892E+04 | 2.3551E+05 | −5.3311E+05 |
| S6 | 5.5029E+02 | −6.3887E+02 | 4.7306E+02 |
| S7 | −1.9957E+00 | 2.2130E+01 | −2.1961E+01 |
| S8 | −4.6604E+02 | 6.4328E+02 | −6.3154E+02 |
| S9 | −8.3573E+00 | 4.0200E+00 | −1.1930E+00 |
| S10 | −3.7319E+01 | 4.9974E+01 | −4.4341E+01 |
| S11 | −4.0302E−01 | 1.9695E−01 | −6.4629E−02 |
| S12 | −1.3730E−02 | 3.9075E−03 | −7.8650E−04 |

Figure 2A:
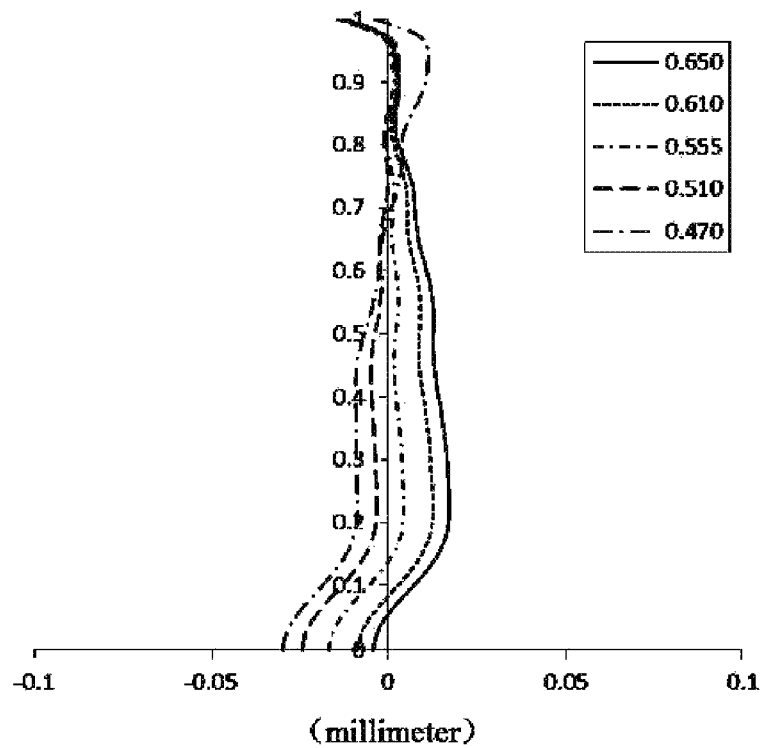
FIGS. 2A-2D show a longitudinal aberration curve, an astigmatism curve, a distortion curve and a lateral color curve of an optical imaging lens according to Embodiment 1 respectively.
Figure 2B:
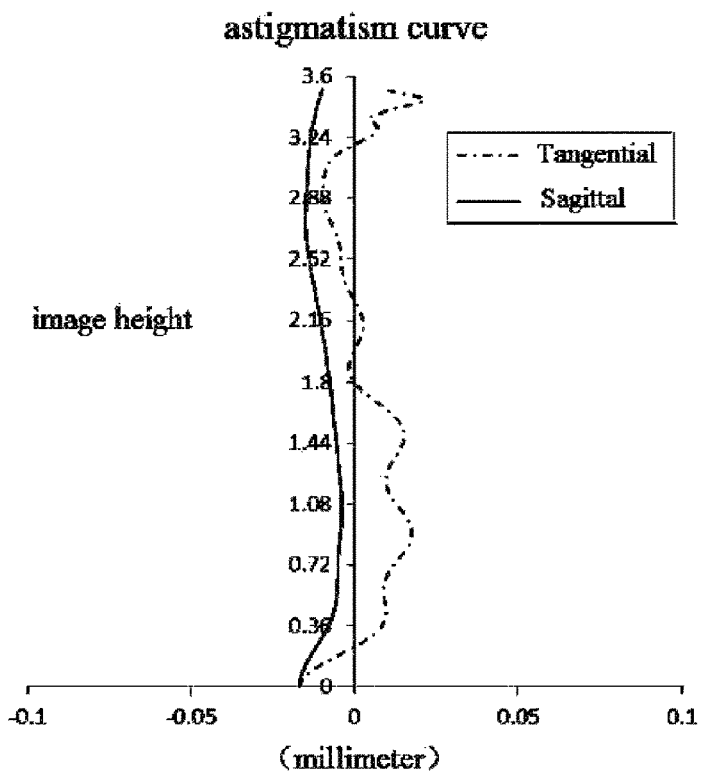
Figure 2C:
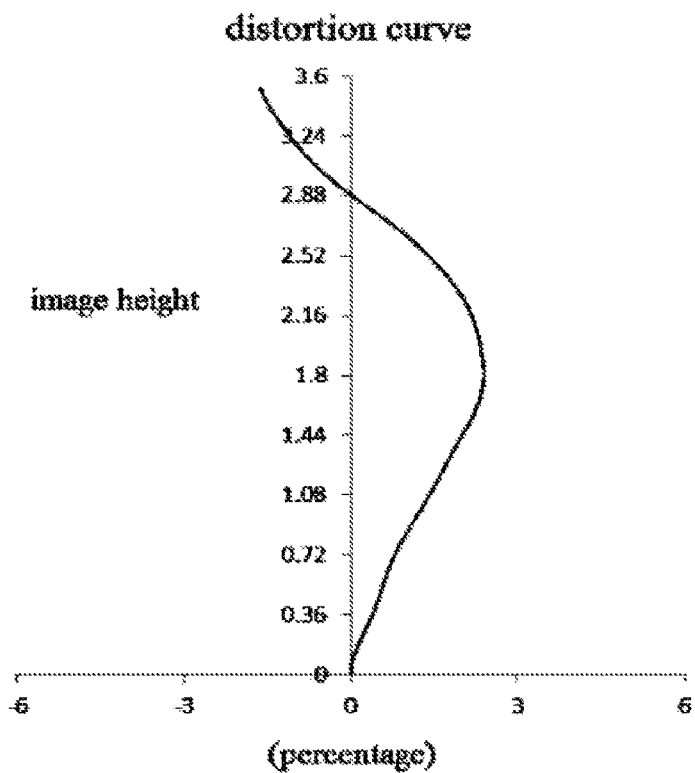
Figure 2D:
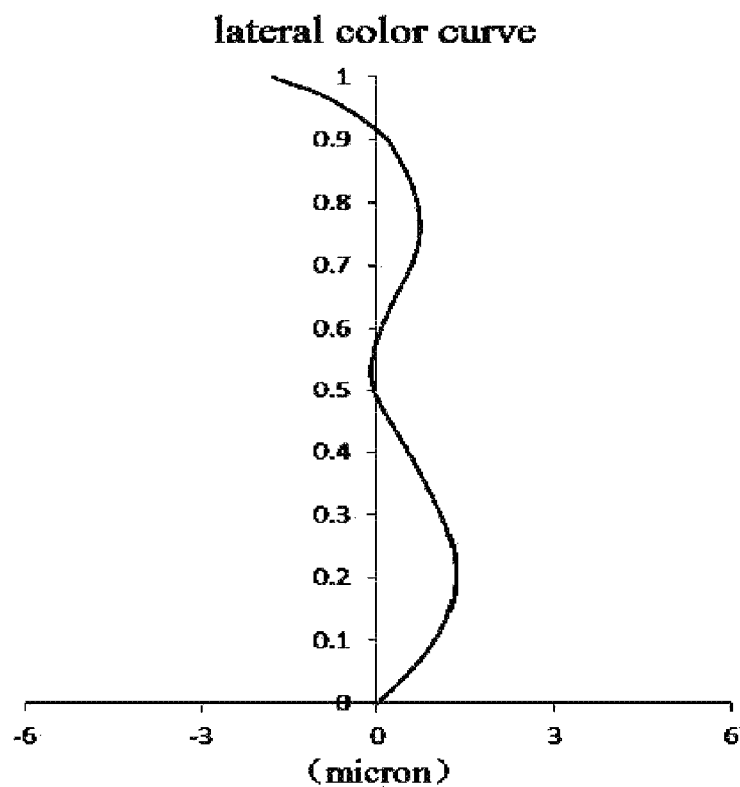

FIG. 2A shows a longitudinal aberration curve of the optical imaging lens of Embodiment 1, which represents deviation of a convergence focal point after light with different wavelengths passes through the lens. FIG. 2B shows an astigmatism curve of the optical imaging lens of Embodiment 1, which represents a curvature of tangential image surface and a curvature of sagittal image surface. FIG. 2C shows a distortion curve of the optical imaging lens of Embodiment 1, which represents distortion magnitude values corresponding to different image heights. FIG. 2D shows a lateral color curve of the optical imaging lens of Embodiment 1, which represents deviation of different image heights on the imaging surface after the light passes through the lens. According to FIGS. 2A-2D, it can be seen that the optical imaging lens provided in Embodiment 1 may achieve good imaging quality.

Embodiment 2

Figure 3:
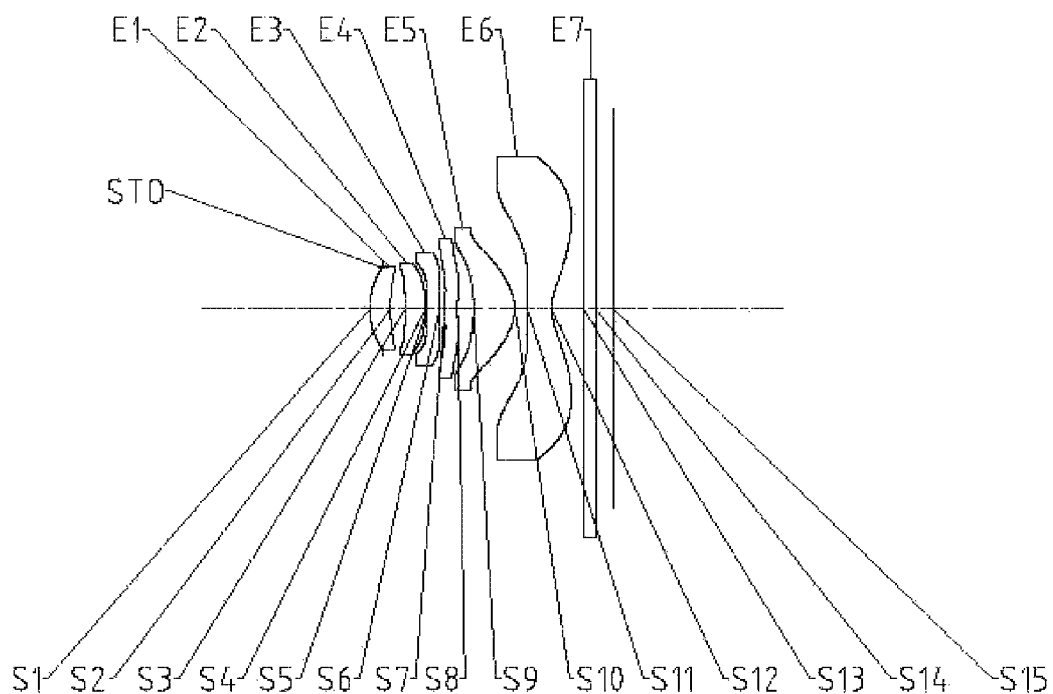
FIG. 3 shows a structural schematic diagram of an optical imaging lens according to Embodiment 2 of the disclosure.

An optical imaging lens according to Embodiment 2 of the disclosure will be described below with reference to FIGS. 3-4D. In the embodiment and the following embodiments, parts of descriptions similar to those about embodiment are omitted for simplicity. FIG. 3 shows a structural schematic diagram of an optical imaging lens according to Embodiment 2 of the disclosure.

As shown in FIG. 3, the optical imaging lens sequentially includes, from an object side to an image side along an optical axis, a diaphragm STO, a first lens E1, a second lens E2, a third lens E3, a fourth lens E4, a fifth lens E5 and a sixth lens E6.

The first lens E1 has a positive refractive power, an object-side surface S1 thereof is a convex surface, and an image-side surface S2 thereof is a concave surface. The second lens E2 has a positive refractive power, an object-side surface S3 thereof is a concave surface, and an image-side surface S4 thereof is a convex surface. The third lens E3 has a negative refractive power, an object-side surface S5 thereof is a concave surface, and an image-side surface S6 thereof is a convex surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a concave surface, and an image-side surface S10 thereof is a convex surface. The sixth lens E6 has a negative refractive power, an object-side surface S11 thereof is a convex surface, and an image-side surface S12 thereof is a concave surface. An optical filter E7 has an object-side surface S13 and an image-side surface S14. The optical imaging lens has an imaging surface S15. Light from an object sequentially penetrates through each of the surfaces S1 to S14 and is finally imaged on the imaging surface S15.

In Embodiment 2, a value of a total effective focal length f of the optical imaging lens is 3.08 mm, TTL is a distance from an object-side surface S1 of the first lens E1 to an imaging surface S15 of the optical imaging lens on the optical axis, and a value of TTL is 4.35 mm, and ImgH is a half the diagonal length of an effective pixel area on the imaging surface S15 of the optical imaging lens, and a value of ImgH is 3.52 mm.

Table 3 shows a table of basic parameters the optical imaging lens of Embodiment 2, wherein the units of the curvature radius, the thickness/distance and the focal length are all millimeters (mm). Table 4 shows high-order coefficients applied to each aspherical mirror surface in Embodiment 2. A surface type of each aspherical surface may be defined by the formula (1) given in Embodiment 1.

shows an astigmatism curve of the optical imaging lens of Embodiment 2, which represents a curvature of tangential image surface and a curvature of sagittal image surface. FIG. 4C shows a distortion curve of the optical imaging lens of Embodiment 2, which represents distortion magnitude values corresponding to different image heights. FIG. 4D shows a lateral color curve of the optical imaging lens of Embodiment 2, which represents deviation of different image

TABLE 3

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | 350.0000 | | | | |
| STO | Spherical | Infinite | −0.2152 | | | | |
| S1 | Aspherical | 1.3678 | 0.3630 | 1.55 | 56.1 | 4.47 | −2.9963 |
| S2 | Aspherical | 2.8182 | 0.2625 | | | | 8.6074 |
| S3 | Aspherical | −11.9913 | 0.3584 | 1.55 | 56.1 | 7.20 | 47.9055 |
| S4 | Aspherical | −2.9929 | 0.0400 | | | | 0.0000 |
| S5 | Aspherical | −5.5573 | 0.2150 | 1.68 | 19.2 | −9.92 | 0.0000 |
| S6 | Aspherical | −32.5264 | 0.0998 | | | | 90.0000 |
| S7 | Aspherical | 5.6959 | 0.2215 | 1.67 | 20.4 | −16.62 | −91.4186 |
| S8 | Aspherical | 3.7041 | 0.2909 | | | | 0.0000 |
| S9 | Aspherical | −2.8755 | 0.7300 | 1.55 | 56.1 | 1.67 | 0.0000 |
| S10 | Aspherical | −0.7559 | 0.2282 | | | | −1.0000 |
| S11 | Aspherical | 42.8537 | 0.4319 | 1.54 | 55.7 | −1.67 | −49.1749 |
| S12 | Aspherical | 0.8750 | 0.5710 | | | | −4.4573 |
| S13 | Spherical | Infinite | 0.2165 | 1.52 | 64.2 | | |
| S14 | Spherical | Infinite | 0.3186 | | | | |
| S15 | Spherical | Infinite | | | | | |

TABLE 4

| Surface number | A4 | A6 | A8 | A10 | A12 | A14 |
|---|---|---|---|---|---|---|
| S1 | 9.9779E−02 | 3.1157E+00 | −7.7692E+01 | 1.2089E+03 | −1.2452E+04 | 8.8311E+04 |
| S2 | −2.0836E−02 | −9.4198E−01 | 2.8618E+01 | −5.5320E+02 | 6.9212E+03 | −5.8847E+04 |
| S3 | −1.5626E−01 | 3.0029E−01 | −4.8980E+00 | 3.8286E+01 | −1.9620E+02 | 6.6331E+02 |
| S4 | 1.1465E−01 | −2.9132E+00 | −1.5714E+00 | 2.3945E+02 | −2.6742E+03 | 1.7006E+04 |
| S5 | 3.1566E−01 | −8.1913E−01 | −4.7853E+01 | 7.5567E+02 | −6.6322E+03 | 3.9026E+04 |
| S6 | 2.2383E−01 | −1.4917E+00 | 7.2760E+00 | −3.3163E+01 | 1.1097E+02 | −2.5112E+02 |
| S7 | −3.8922E−01 | −3.0527E−02 | 2.6452E+00 | −1.1656E+01 | 2.7091E+01 | −3.1310E+01 |
| S8 | −4.6731E−01 | 9.5543E−01 | −5.7465E+00 | 3.3166E+01 | −1.3425E+02 | 3.7539E+02 |
| S9 | −6.4794E−02 | 2.9914E−01 | −2.0353E+00 | 7.4421E+00 | −1.6340E+01 | 2.2479E+01 |
| S10 | 4.5183E−01 | −1.0998E+00 | 2.2083E+00 | −2.8451E+00 | −4.3873E+00 | 1.1800E+01 |
| S11 | 4.4535E−01 | −5.0346E−01 | 8.9828E−01 | −8.7491E−01 | 4.8302E−01 | −1.0948E−01 |
| S12 | −1.3133E−01 | 9.3928E−02 | −7.3377E−02 | 7.0084E−02 | −5.9055E−02 | 3.5585E−02 |

| Surface number | A16 | A18 | A20 |
|---|---|---|---|
| S1 | −4.4202E+05 | 1.5819E+06 | −4.0564E+06 |
| S2 | 3.4999E+05 | −1.4792E+06 | 4.4604E+06 |
| S3 | −1.4833E+03 | 2.1140E+03 | −1.7462E+03 |
| S4 | −7.1182E+04 | 2.0407E+05 | −4.0359E+05 |
| S5 | −1.6238E+05 | 4.8773E+05 | −1.0628E+06 |
| S6 | 3.6658E+02 | −3.1571E+02 | 1.1142E+02 |
| S7 | 1.0511E+01 | 1.4892E+01 | −1.9333E+01 |
| S8 | −7.3986E+02 | 1.0428E+03 | −1.0524E+03 |
| S9 | −1.9999E+01 | 1.1557E+01 | −4.1186E+00 |
| S10 | −2.8428E+01 | 3.8689E+01 | −3.4446E+01 |
| S11 | −4.0416E−02 | 4.3365E−02 | −1.7583E−02 |
| S12 | −1.4911E−02 | 4.3946E−03 | −9.1847E−04 |

Figure 4A:
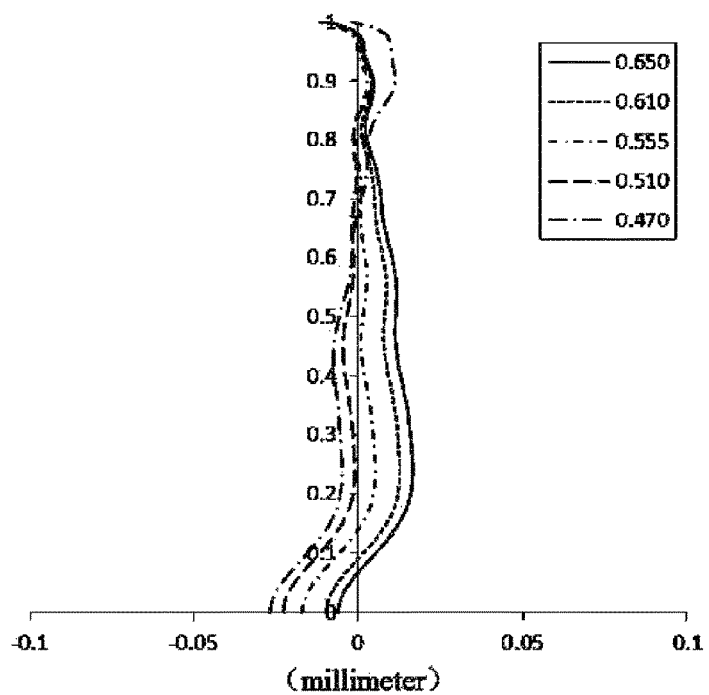
FIGS. 4A-4D show a longitudinal aberration curve, an astigmatism curve, a distortion curve and a lateral color curve of an optical imaging lens according to Embodiment 2 respectively.
Figure 4B:
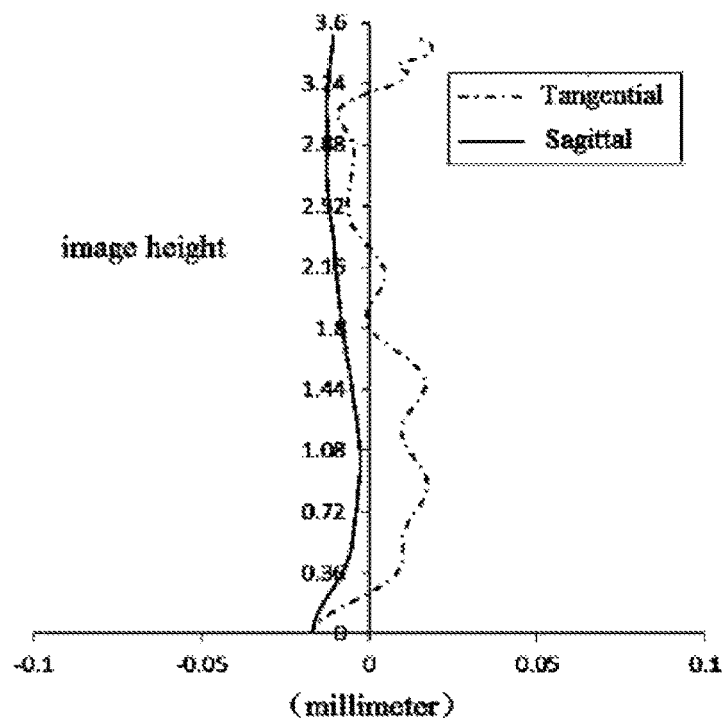
Figure 4C:
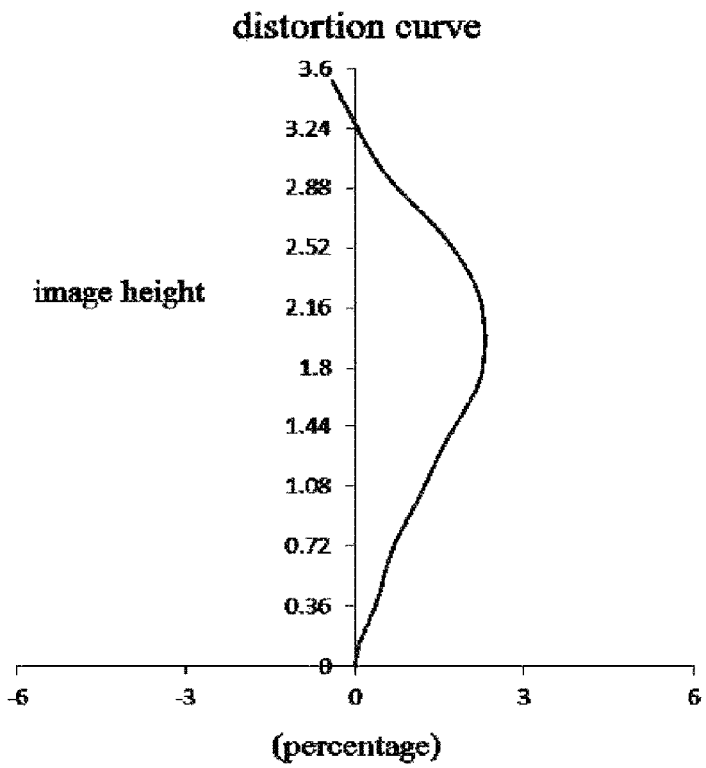
Figure 4D:
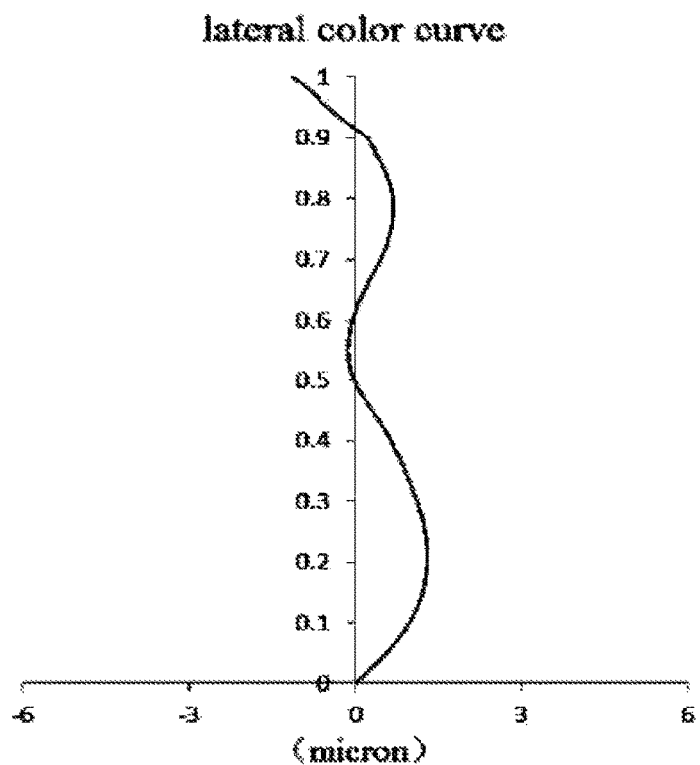

FIG. 4A shows a longitudinal aberration curve of the optical imaging lens of Embodiment 2, which represents deviation of a convergence focal point after light with different wavelengths passes through the lens. FIG. 4B heights on the imaging surface after the light passes through the lens. According to FIGS. 4A-4D, it can be seen that the optical imaging lens provided in Embodiment 2 may achieve good imaging quality.

Embodiment 3

Figure 5:
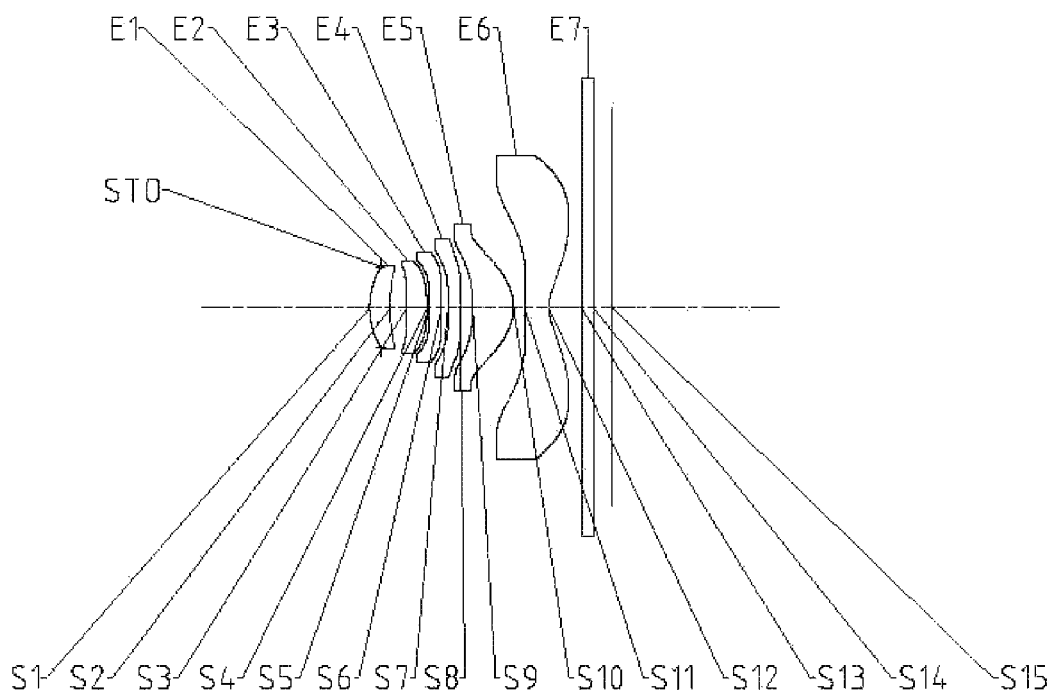
FIG. 5 shows a structural schematic diagram of an optical imaging lens according to Embodiment 3 of the disclosure.

An optical imaging lens according to Embodiment 3 of the disclosure is described below with reference to FIGS. 5-6D. FIG. 5 shows a structural schematic diagram of an optical imaging lens according to Embodiment 3 of the disclosure.

As shown in FIG. 5, the optical imaging lens sequentially includes, from an object side to an image side along an optical axis, a diaphragm STO, a first lens E1, a second lens E2, a third lens E3, a fourth lens E4, a fifth lens E5 and a sixth lens E6.

The first lens E1 has a positive refractive power, an object-side surface S1 thereof is a convex surface, and an image-side surface S2 thereof is a concave surface. The second lens E2 has a positive refractive power, an object-side surface S3 thereof is a concave surface, and an image-side surface S4 thereof is a convex surface. The third lens E3 has a negative refractive power, an object-side surface S5 thereof is a concave surface, and an image-side surface S6 thereof is a convex surface. The fourth lens E4 has a negative refractive power, an object-side surface S7 thereof is a concave surface, and an image-side surface S8 thereof is a concave surface. The fifth lens E5 has a positive refractive power, an object-side surface S9 thereof is a concave surface, and an image-side surface S10 thereof is a convex surface. The sixth lens E6 has a negative refractive power, an object-side surface S11 thereof is a convex surface, and an image-side surface S12 thereof is a concave surface. An optical filter E7 has an object-side surface S13 and an image-side surface S14. The optical imaging lens has an imaging surface S15. Light from an object sequentially penetrates through each of the surfaces S1 to S14 and is finally imaged on the imaging surface 515.

In Embodiment 3, a value of a total effective focal length f of the optical imaging lens is 3.06 mm, TTL is a distance from an object-side surface S1 of the first lens E1 to an imaging surface S15 of the optical imaging lens on the optical axis, and a value of TTL is 4.32 mm, and ImgH is a half the diagonal length of an effective pixel area on the imaging surface S15 of the optical imaging lens, and a value of ImgH is 3.53 mm.

Table 5 shows a table of basic parameters the optical imaging lens of Embodiment 3, wherein the units of the curvature radius, the thickness/distance and the focal length are all millimeters (mm). Table 6 shows high-order coefficients applied to each aspherical mirror surface in Embodiment 3. A surface type of each aspherical surface may be defined by the formula (1) given in Embodiment 1.

TABLE 5

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | 350.0000 | | | | |
| STO | Spherical | Infinite | −0.2093 | | | | |
| S1 | Aspherical | 1.3622 | 0.3636 | 1.55 | 56.1 | 4.40 | −3.0649 |
| S2 | Aspherical | 2.8463 | 0.2959 | | | | 8.3517 |
| S3 | Aspherical | −25.3136 | 0.3637 | 1.55 | 56.1 | 7.73 | −80.5631 |
| S4 | Aspherical | −3.6368 | 0.0400 | | | | 0.0000 |
| S5 | Aspherical | −6.8264 | 0.2150 | 1.68 | 19.2 | −24.88 | 0.0000 |
| S6 | Aspherical | −11.6163 | 0.1196 | | | | 49.8187 |
| S7 | Aspherical | −20.6547 | 0.2150 | 1.67 | 20.4 | −7.99 | −99.0000 |
| S8 | Aspherical | 7.2181 | 0.2249 | | | | 0.0000 |
| S9 | Aspherical | −2.8959 | 0.7300 | 1.55 | 56.1 | 1.83 | 0.0000 |
| S10 | Aspherical | −0.8080 | 0.1912 | | | | −1.0000 |
| S11 | Aspherical | 3.0680 | 0.4342 | 1.54 | 55.7 | −1.89 | −98.9969 |
| S12 | Aspherical | 0.7263 | 0.5817 | | | | −4.2495 |
| S13 | Spherical | Infinite | 0.2165 | 1.52 | 64.2 | | |
| S14 | Spherical | Infinite | 0.3293 | | | | |
| S15 | Spherical | Infinite | | | | | |

TABLE 6

| Surface number | A4 | A6 | A8 | A10 | A12 | A14 |
|---|---|---|---|---|---|---|
| S1 | 9.3427E−02 | 3.3806E+00 | −8.1017E+01 | 1.2125E+03 | −1.2078E+04 | 8.3264E+04 |
| S2 | −4.0551E−02 | 4.4995E−01 | −1.3846E+01 | 2.1845E+02 | −2.1706E+03 | 1.4091E+04 |
| S3 | −1.3637E−01 | 3.9428E−01 | −5.6206E+00 | 3.9991E+01 | −1.9456E+02 | 6.4244E+02 |
| S4 | 1.7093E−01 | −6.9503E+00 | 6.4608E+01 | −3.7001E+02 | 1.0324E+03 | 1.2600E+03 |
| S5 | 3.4161E−01 | −5.8370E+00 | 2.5318E+01 | 1.1241E+02 | −2.6156E+03 | 2.0005E+04 |
| S6 | 5.4891E−01 | −6.4279E+00 | 4.7052E+01 | −2.5131E+02 | 9.5357E+02 | −2.5944E+03 |
| S7 | 2.3838E−01 | −5.7950E+00 | 3.5574E+01 | −1.3982E+02 | 3.7283E+02 | −6.9029E+02 |
| S8 | 1.3462E−02 | −2.5614E+00 | 9.7996E+00 | −1.2300E+01 | −4.2555E+01 | 2.5046E+02 |
| S9 | 9.3843E−02 | −7.8766E−01 | 3.4643E−01 | 4.6802E+00 | −1.3446E+01 | 1.8209E+01 |
| S10 | 2.5900E−01 | −5.2882E−01 | 9.1082E−01 | −3.0622E+00 | 1.1207E+01 | −2.7382E+01 |
| S11 | −1.0909E−01 | −3.4221E−01 | 1.0320E+00 | −1.3846E+00 | 1.1219E+00 | −5.8856E−01 |
| S12 | −2.1139E−01 | 2.3808E−01 | −2.1567E−01 | 1.5899E−01 | −9.4724E−02 | 4.3998E−02 |

TABLE 6-continued

| Surface number | A16 | A18 | A20 |
|---|---|---|---|
| S1 | −4.0693E+05 | 1.4276E+06 | −3.6007E+06 |
| S2 | −6.0668E+04 | 1.7026E+05 | −2.8667E+05 |
| S3 | −1.4327E+03 | 2.0665E+03 | −1.7504E+03 |
| S4 | −2.3464E+04 | 1.0063E+05 | −2.4505E+05 |
| S5 | −9.2026E+04 | 2.8383E+05 | −6.0698E+05 |
| S6 | 5.0754E+03 | −7.0818E+03 | 6.8746E+03 |
| S7 | 8.8371E+02 | −7.5844E+02 | 4.1112E+02 |
| S8 | −6.4019E+02 | 1.0318E+03 | −1.1302E+03 |
| S9 | −1.4519E+01 | 7.2052E+00 | −2.1793E+00 |
| S10 | 4.4544E+01 | −4.9741E+01 | 3.8658E+01 |
| S11 | 1.9854E−01 | −3.8211E−02 | 1.3542E−03 |
| S12 | −1.5519E−02 | 4.0998E−03 | −8.0248E−04 |

Figure 6A:
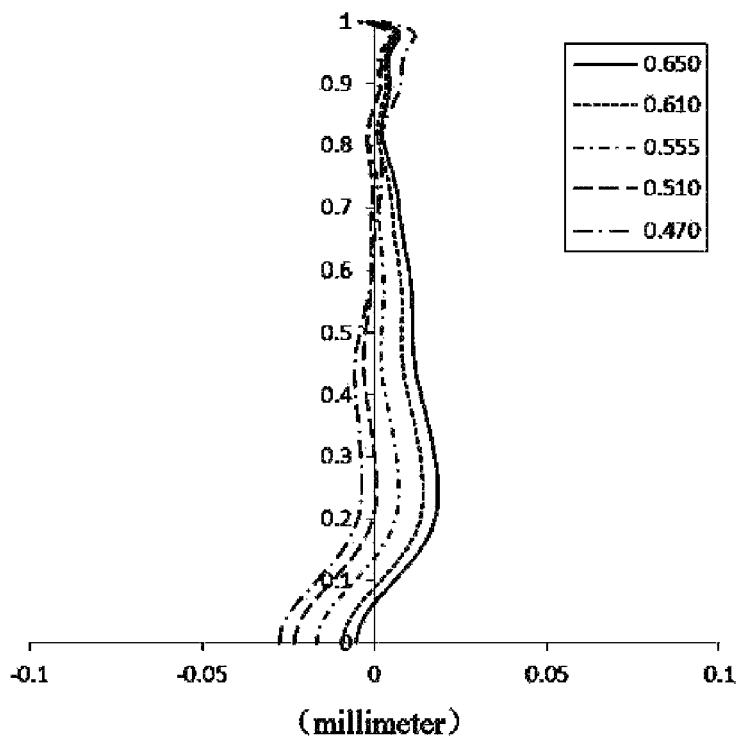
FIGS. 6A-6D show a longitudinal aberration curve, an astigmatism curve, a distortion curve and a lateral color curve of an optical imaging lens according to Embodiment 3 respectively.
Figure 6B:
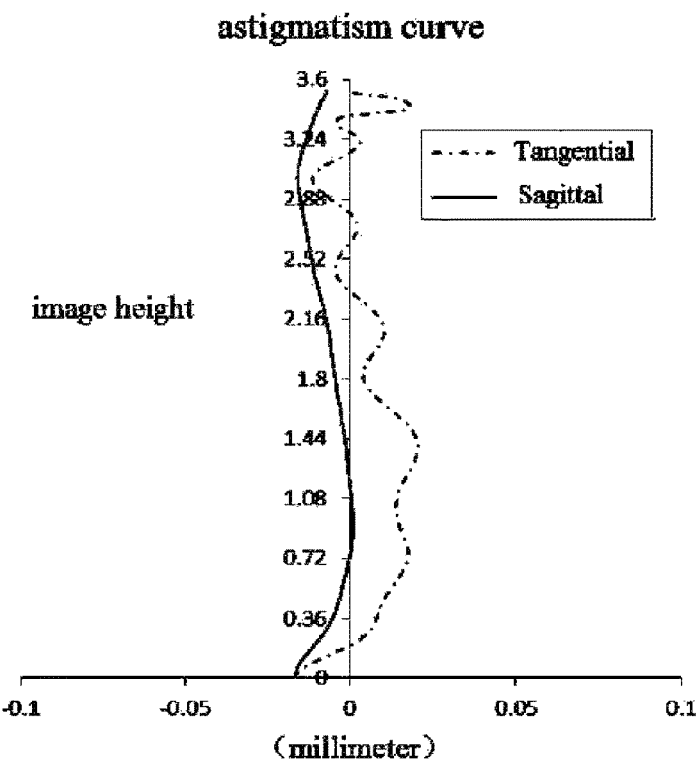
Figure 6C:
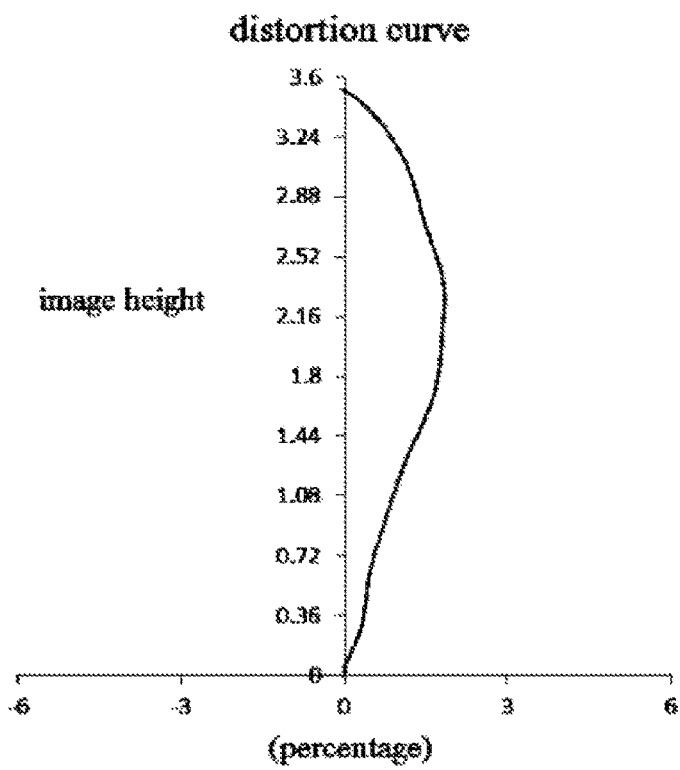
Figure 6D:
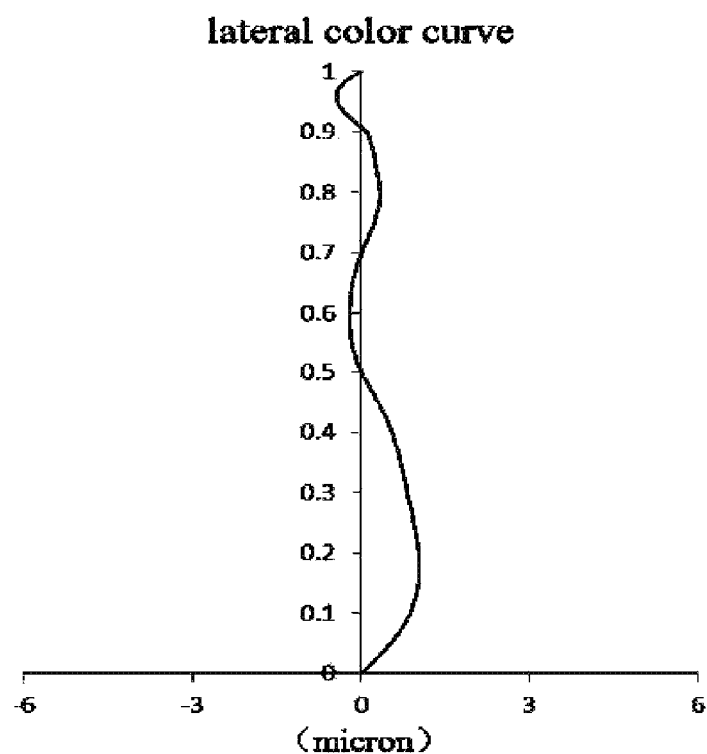

FIG. 6A shows a longitudinal aberration curve of the optical imaging lens of Embodiment 3, which represents deviation of a convergence focal point after light with different wavelengths passes through the lens. FIG. 6B shows an astigmatism curve of the optical imaging lens of Embodiment 3, which represents a curvature of tangential image surface and a curvature of sagittal image surface. FIG. 6C shows a distortion curve of the optical imaging lens of Embodiment 3, which represents distortion magnitude values corresponding to different image heights. FIG. 6D shows a lateral color curve of the optical imaging lens of Embodiment 3, which represents deviation of different image heights on the imaging surface after the light passes through the lens. According to FIGS. 6A-6D, it can be seen that the optical imaging lens provided in Embodiment 3 may achieve good imaging quality.

Embodiment 4

Figure 7:
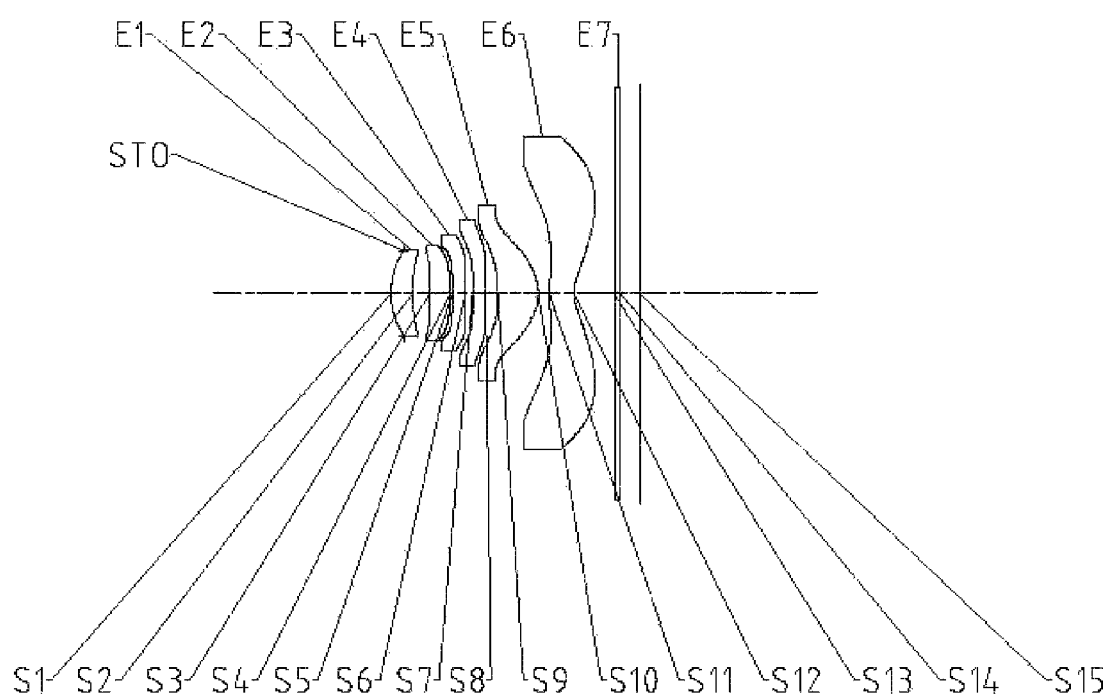
FIG. 7 shows a structural schematic diagram of an optical imaging lens according to Embodiment 4 of the disclosure.

An optical imaging lens according to Embodiment 4 of the disclosure is described below with reference to FIGS. 7-8D. FIG. 7 shows a structural schematic diagram of an optical imaging lens according to Embodiment 4 of the disclosure.

As shown in FIG. 7, the optical imaging lens sequentially includes, from an object side to an image side along an optical axis, a diaphragm STO, a first lens E1, a second lens E2, a third lens E3, a fourth lens E4, a fifth lens E5 and a sixth lens E6.

The first lens E1 has a positive refractive power, an object-side surface S1 thereof is a convex surface, and an image-side surface S2 thereof is a concave surface. The second lens E2 has a positive refractive power, an object-side surface S3 thereof is a concave surface, and an image-side surface S4 thereof is a convex surface. The third lens E3 has a negative refractive power, an object-side surface S5 thereof is a concave surface, and an image-side surface S6 thereof is a convex surface. The fourth lens E4 has a negative refractive power, an object-side surface S7 thereof is a concave surface, and an image-side surface S8 thereof is a concave surface. The fifth lens E5 has a positive refractive power, an object-side surface S9 thereof is a concave surface, and an image-side surface S10 thereof is a convex surface. The sixth lens E6 has a negative refractive power, an object-side surface S11 thereof is a convex surface, and an image-side surface S12 thereof is a concave surface. An optical filter E7 has an object-side surface S13 and an image-side surface S14. The optical imaging lens has an imaging surface S15. Light from an object sequentially penetrates through each of the surfaces S1 to S14 and is finally imaged on the imaging surface S15.

In Embodiment 4, a value of a total effective focal length f of the optical imaging lens is 3.03 mm, TTL is a distance from an object-side surface S1 of the first lens E1 to an imaging surface S15 of the optical imaging lens on the optical axis, and a value of TTL is 4.21 mm, and ImgH is a half the diagonal length of an effective pixel area on the imaging surface S15 of the optical imaging lens, and a value of ImgH is 3.53 mm.

Table 7 shows a table of basic parameters the optical imaging lens of Embodiment 4, wherein the units of the curvature radius, the thickness/distance and the focal length are all millimeters (mm). Table 8 shows high-order coefficients applied to each aspherical mirror surface in Embodiment 4. A surface type of each aspherical surface may be defined by the formula (1) given in Embodiment 1.

TABLE 7

| | | | | Material | | | |
|---|---|---|---|---|---|---|---|
| Surface number | Surface type | Curvature radius | Thickness/ distance | Refractive index | Abbe number | Focal length | Conic coefficient |
| OBJ | Spherical | Infinite | 350.0000 | | | | |
| STO | Spherical | Infinite | −0.2130 | | | | |
| S1 | Aspherical | 1.3252 | 0.3649 | 1.55 | 56.1 | 4.40 | −3.0092 |
| S2 | Aspherical | 2.6664 | 0.2901 | | | | 7.5810 |
| S3 | Aspherical | −40.2198 | 0.3461 | 1.55 | 56.1 | 8.48 | −0.8102 |
| S4 | Aspherical | −4.1656 | 0.0409 | | | | 0.0000 |
| S5 | Aspherical | −10.2195 | 0.2150 | 1.68 | 19.2 | −33.70 | 0.0000 |
| S6 | Aspherical | −18.6532 | 0.1248 | | | | −41.4921 |
| S7 | Aspherical | −183.8960 | 0.2150 | 1.67 | 20.4 | −7.96 | −99.0000 |
| S8 | Aspherical | 5.4727 | 0.2108 | | | | 0.0000 |
| S9 | Aspherical | −2.4635 | 0.6863 | 1.55 | 56.1 | 1.86 | 0.0000 |
| S10 | Aspherical | −0.7910 | 0.1878 | | | | −1.0000 |
| S11 | Aspherical | 2.5066 | 0.4200 | 1.54 | 55.7 | −2.00 | −54.4590 |
| S12 | Aspherical | 0.7092 | 0.6786 | | | | −4.3871 |
| S13 | Spherical | Infinite | 0.1100 | 1.52 | 64.2 | | |

TABLE 7-continued

| Surface number | Surface type | Curvature radius | Thickness/ distance | Material Refractive index | Material Abbe number | Focal length | Conic coefficient |
|---|---|---|---|---|---|---|---|
| S14 | Spherical | Infinite | 0.3197 | | | | |
| S15 | Spherical | Infinite | | | | | |

TABLE 8

| Surface number | A4 | A6 | A8 | A10 | A12 | A14 |
|---|---|---|---|---|---|---|
| S1 | 5.9026E−02 | 4.8892E+00 | −1.1337E+02 | 1.6512E+03 | −1.6044E+04 | 1.0795E+05 |
| S2 | −2.4261E−02 | −7.9398E−01 | 2.1354E+01 | −3.8128E+02 | 4.3942E+03 | −3.4358E+04 |
| S3 | −1.2952E−01 | 2.4488E−01 | −3.1238E+00 | 1.6238E+01 | −5.3182E+01 | 8.9818E+01 |
| S4 | 1.3513E−01 | −3.6309E+00 | 3.5087E−01 | 3.8894E+02 | −5.0422E+03 | 3.5141E+04 |
| S5 | 3.2140E−01 | −3.1924E+00 | −2.2039E+01 | 6.3498E+02 | −6.6168E+03 | 4.1806E+04 |
| S6 | 5.5426E−01 | −6.3935E+00 | 4.8159E+01 | −2.6431E+02 | 1.0146E+03 | −2.7441E+03 |
| S7 | 2.4606E−01 | −6.2019E+00 | 4.0000E+01 | −1.6426E+02 | 4.5529E+02 | −8.6646E+02 |
| S8 | 4.5901E−02 | −2.8998E+00 | 1.1744E+01 | −2.0001E+01 | −2.1893E+01 | 2.1092E+02 |
| S9 | 1.5527E−01 | −9.7459E−01 | 8.3106E−01 | 3.9440E+00 | −1.4247E+01 | 2.3253E+01 |
| S10 | 2.1688E−01 | −2.0341E−01 | −6.0923E−01 | 2.1455E+00 | −2.0921E+00 | −2.3584E+00 |
| S11 | −1.8592E−01 | 2.6451E−02 | 1.9484E−01 | −2.0783E−01 | −8.6299E−03 | 1.9160E−01 |
| S12 | −2.2637E−01 | 2.9683E−01 | −3.3354E−01 | 3.0339E−01 | −2.1415E−01 | 1.1374E−01 |

| Surface number | A16 | A18 | A20 |
|---|---|---|---|
| S1 | −5.1446E+05 | 1.7543E+06 | −4.2756E+06 |
| S2 | 1.8744E+05 | −7.2406E+05 | 1.9852E+06 |
| S3 | −1.4871E+01 | −2.2095E+02 | 3.3862E+02 |
| S4 | −1.5692E+05 | 4.7326E+05 | −9.7701E+05 |
| S5 | −1.7784E+05 | 5.2997E+05 | −1.1217E+06 |
| S6 | 5.2532E+03 | −7.0783E+03 | 6.5674E+03 |
| S7 | 1.1279E+03 | −9.8132E+02 | 5.4316E+02 |
| S8 | −5.8197E+02 | 9.6372E+02 | −1.0700E+03 |
| S9 | −2.2583E+01 | 1.3656E+01 | −4.9568E+00 |
| S10 | 9.9505E+00 | −1.4711E+01 | 1.2986E+01 |
| S11 | −1.9803E−01 | 1.1170E−01 | −4.0672E−02 |
| S12 | −4.4883E−02 | 1.3088E−02 | −2.8003E−03 |

Figure 8A:
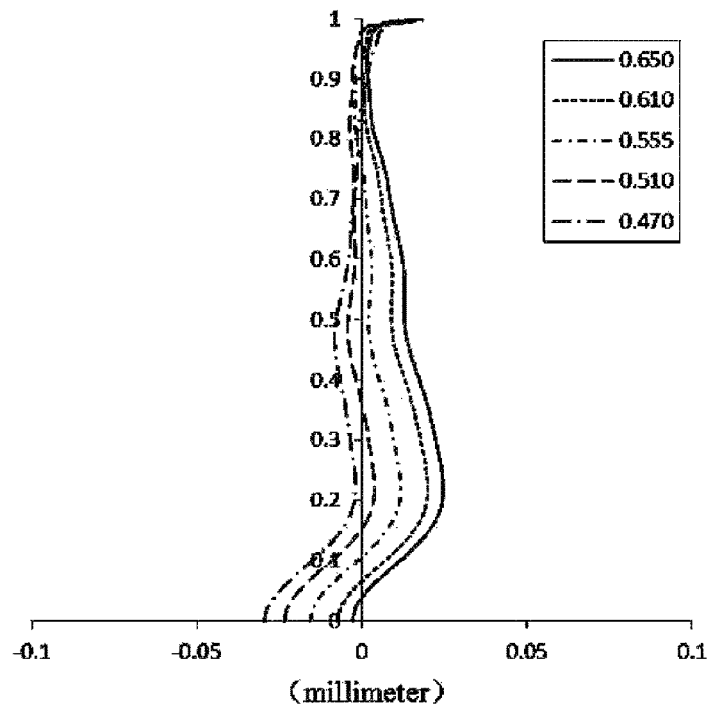
FIGS. 8A-8D show a longitudinal aberration curve, an astigmatism curve, a distortion curve and a lateral color curve of an optical imaging lens according to Embodiment 4 respectively.
Figure 8B:
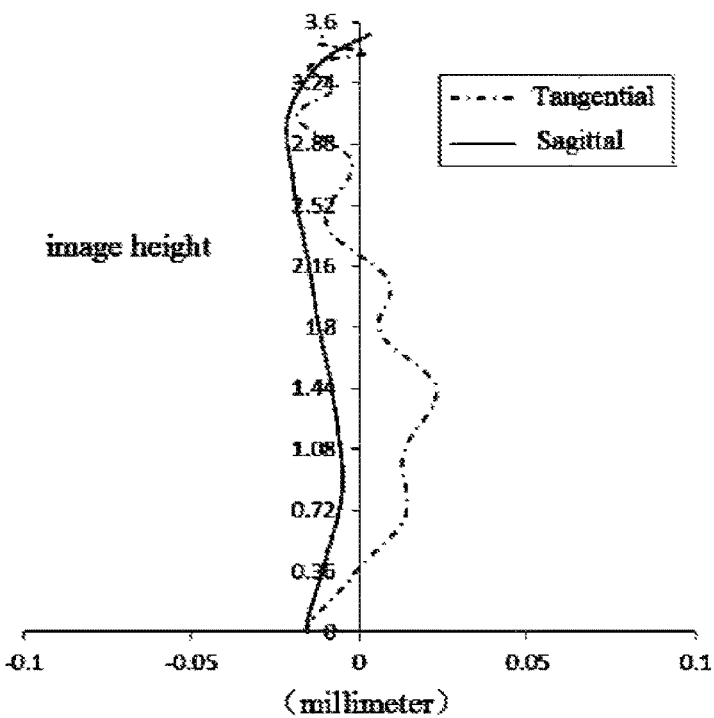
Figure 8C:
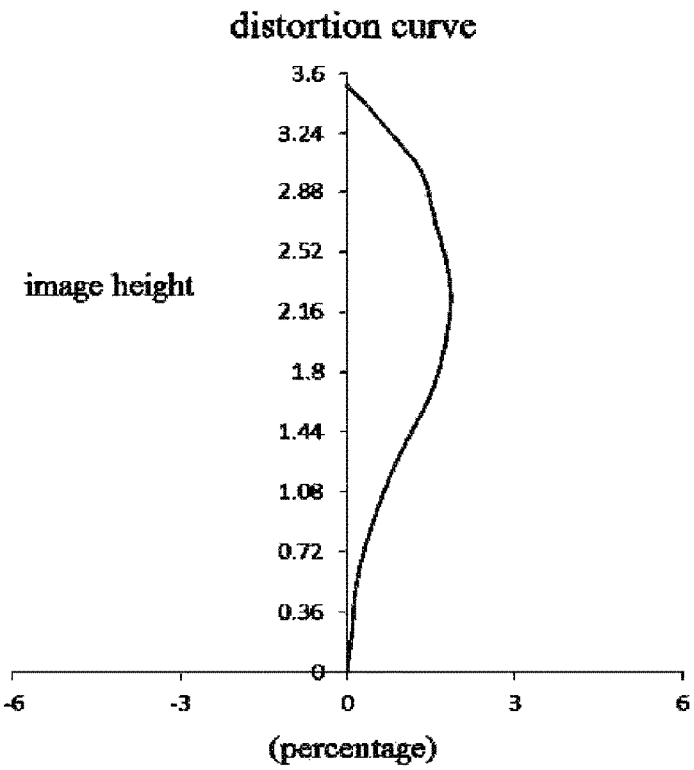
Figure 8D:
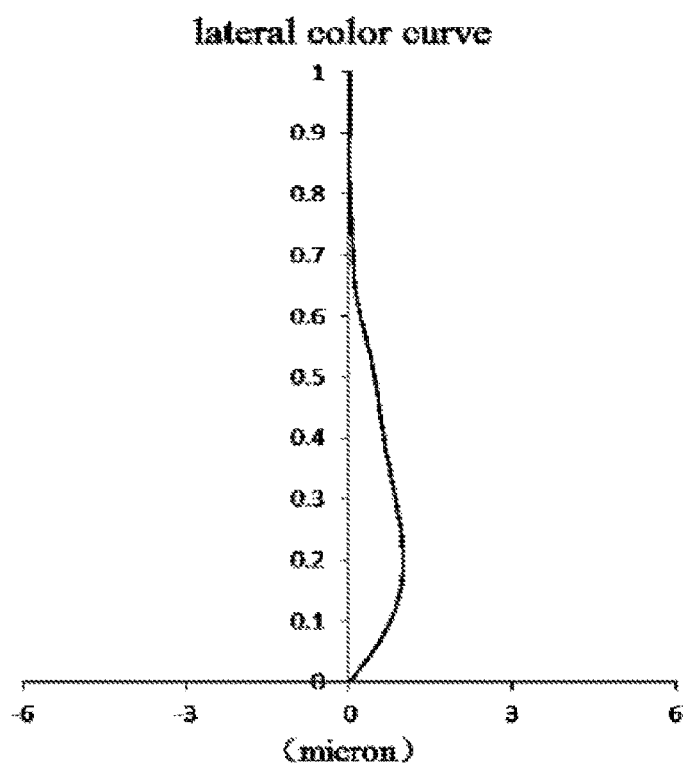

FIG. 8A shows a longitudinal aberration curve of the optical imaging lens of Embodiment 4, which represents deviation of a convergence focal point after light with different wavelengths passes through the lens. FIG. 8B shows an astigmatism curve of the optical imaging lens of Embodiment 4, which represents a curvature of tangential image surface and a curvature of sagittal image surface. FIG. 8C shows a distortion curve of the optical imaging lens of Embodiment 4, which represents distortion magnitude values corresponding to different image heights. FIG. 8D shows a lateral color curve of the optical imaging lens of Embodiment 4, which represents deviation of different image heights on the imaging surface after the light passes through the lens. According to FIGS. 8A-8D, it can be seen that the optical imaging lens provided in Embodiment 4 may achieve good imaging quality.

Embodiment 5

Figure 9:
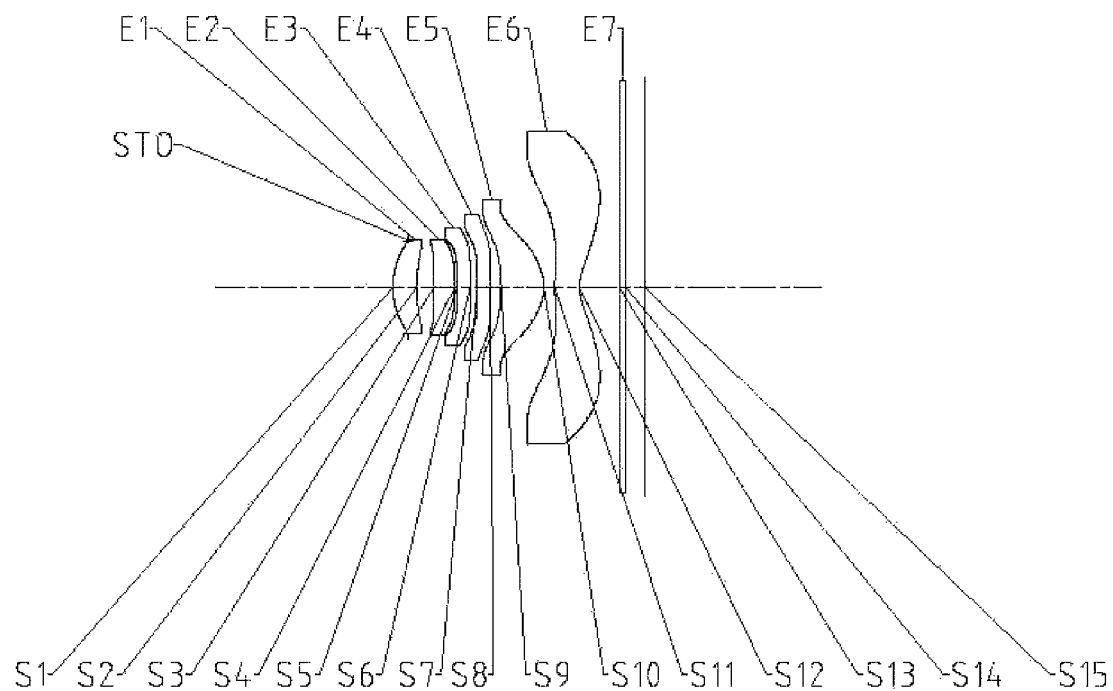
FIG. 9 shows a structural schematic diagram of an optical imaging lens according to Embodiment 5 of the disclosure.

An optical imaging lens according to Embodiment 5 of the disclosure is described below with reference to FIGS. 9-10D. FIG. 9 shows a structural schematic diagram of an optical imaging lens according to Embodiment 5 of the disclosure.

As shown in FIG. 9, the optical imaging lens sequentially includes, from an object side to an image side along an optical axis, a diaphragm STO, a first lens E1, a second lens E2, a third lens E3, a fourth lens E4, a fifth lens E5 and a sixth lens E6.

The first lens E1 has a positive refractive power, an object-side surface S1 thereof is a convex surface, and an image-side surface S2 thereof is a concave surface. The second lens E2 has a positive refractive power, an object-side surface S3 thereof is a concave surface, and an image-side surface S4 thereof is a convex surface. The third lens E3 has a negative refractive power, an object-side surface S5 thereof is a concave surface, and an image-side surface S6 thereof is a convex surface. The fourth lens E4 has a negative refractive power, an object-side surface S7 thereof is a concave surface, and an image-side surface S8 thereof is a concave surface. The fifth lens E5 has a positive refractive power, an object-side surface S9 thereof is a concave surface, and an image-side surface S10 thereof is a convex surface. The sixth lens E6 has a negative refractive power, an object-side surface S11 thereof is a convex surface, and an image-side surface S12 thereof is a concave surface. An optical filter E7 has an object-side surface S13 and an image-side surface S14. The optical imaging lens has an imaging surface S15. Light from an object sequentially penetrates through each of the surfaces S1 to S14 and is finally imaged on the imaging surface S15.

In Embodiment 5, a value of a total effective focal length f of the optical imaging lens is 3.05 mm, TTL is a distance from an object-side surface S1 of the first lens E1 to an imaging surface S15 of the optical imaging lens on the optical axis, and a value of TTL is 4.25 mm, and ImgH is a half the diagonal length of an effective pixel area on the imaging surface S15 of the optical imaging lens, and a value of ImgH is 3.53 mm.

Table 9 shows a table of basic parameters the optical imaging lens of Embodiment 5, wherein the units of the curvature radius, the thickness/distance and the focal length are all millimeters (mm). Table 10 shows high-order coefficients applied to each aspherical mirror surface in Embodiment 5. A surface type of each aspherical surface may be defined by the formula (1) given in Embodiment 1.

TABLE 9

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | 350.0000 | | | | |
| STO | Spherical | Infinite | −0.2519 | | | | |
| S1 | Aspherical | 1.3552 | 0.4009 | 1.55 | 56.1 | 4.33 | −3.0342 |
| S2 | Aspherical | 2.8463 | 0.2900 | | | | 8.4426 |
| S3 | Aspherical | −49.0514 | 0.3544 | 1.55 | 56.1 | 8.26 | −96.0611 |
| S4 | Aspherical | −4.1419 | 0.0400 | | | | 0.0000 |
| S5 | Aspherical | −7.5934 | 0.2150 | 1.68 | 19.2 | −26.54 | 0.0000 |
| S6 | Aspherical | −13.2928 | 0.1214 | | | | −89.7515 |
| S7 | Aspherical | −33.2716 | 0.2150 | 1.67 | 20.4 | −7.16 | −13.2154 |
| S8 | Aspherical | 5.5893 | 0.1890 | | | | 0.0000 |
| S9 | Aspherical | −3.0061 | 0.7206 | 1.55 | 56.1 | 1.75 | 0.0000 |
| S10 | Aspherical | −0.7876 | 0.1825 | | | | −1.0000 |
| S11 | Aspherical | 3.1914 | 0.4200 | 1.54 | 55.7 | −1.89 | −63.7171 |
| S12 | Aspherical | 0.7334 | 0.6751 | | | | −4.3050 |
| S13 | Spherical | Infinite | 0.1100 | 1.52 | 64.2 | | |
| S14 | Spherical | Infinite | 0.3162 | | | | |
| S15 | Spherical | Infinite | | | | | |

TABLE 10

| Surface number | A4 | A6 | A8 | A10 | A12 | A14 |
|---|---|---|---|---|---|---|
| S1 | 4.8404E−02 | 4.1826E+00 | −8.5487E+01 | 1.1177E+03 | −9.8788E+03 | 6.1114E+04 |
| S2 | −2.4936E−02 | −3.8792E−01 | 7.9726E+00 | −1.1615E+02 | 1.0358E+03 | −5.7641E+03 |
| S3 | −1.5700E−01 | 1.5646E+00 | −2.5326E+01 | 2.4521E+02 | −1.5624E+03 | 6.6869E+03 |
| S4 | 1.8795E−01 | −2.3564E+00 | −3.2224E+01 | 7.3452E+02 | −7.1561E+03 | 4.3131E+04 |
| S5 | 4.1179E−01 | −4.1497E+00 | 1.3602E+01 | 1.6593E+02 | −1.2512E+03 | 3.3982E+03 |
| S6 | 5.0177E−01 | −4.7714E+00 | 3.0266E+01 | −1.5511E+02 | 5.8871E+02 | −1.6143E+03 |
| S7 | 2.8405E−02 | −2.9578E+00 | 1.5795E+01 | −4.9871E+01 | 8.3966E+01 | −8.0753E+00 |
| S8 | −1.7075E−01 | −1.0033E+00 | 2.1540E+00 | 1.2071E+01 | −9.8651E+01 | 3.4945E+02 |
| S9 | 4.6601E−02 | −7.2915E−01 | 1.3176E+00 | −4.3462E+00 | −2.3778E+00 | 5.1000E+00 |
| S10 | 2.6662E−01 | −4.0582E−01 | −2.5744E−01 | 2.9768E+00 | −7.4973E+00 | 1.0459E+01 |
| S11 | −2.1179E−01 | 3.9163E−02 | 3.4886E−01 | −6.4676E−01 | 5.9379E−01 | −3.2684E−01 |
| S12 | −2.5093E−01 | 3.4471E−01 | −3.7499E−01 | 3.1356E−01 | −1.9964E−01 | 9.5507E−02 |

| Surface number | A16 | A18 | A20 |
|---|---|---|---|
| S1 | −2.7041E+05 | 8.6511E+05 | −2.0029E+06 |
| S2 | 1.8988E+04 | −2.6380E+04 | −5.4495E+04 |
| S3 | −1.9339E+04 | 3.7264E+04 | −4.5824E+04 |
| S4 | −1.7479E+05 | 4.8999E+05 | −9.5347E+05 |
| S5 | 6.9921E+03 | −9.0848E+04 | 3.5561E+05 |
| S6 | 3.1623E+03 | −4.3740E+03 | 4.1676E+03 |
| S7 | −2.9970E+02 | 7.0922E+02 | −8.4094E+02 |
| S8 | −7.7664E+02 | 1.1797E+03 | −1.2585E+03 |
| S9 | −4.9945E+00 | 2.5668E+00 | −5.0583E−01 |
| S10 | −8.4313E+00 | 2.9737E+00 | 1.1978E+00 |
| S11 | 1.0721E−01 | −1.5837E−02 | −2.3856E−03 |
| S12 | −3.4083E−02 | 9.0330E−03 | −1.7654E−03 |

Figure 10A:
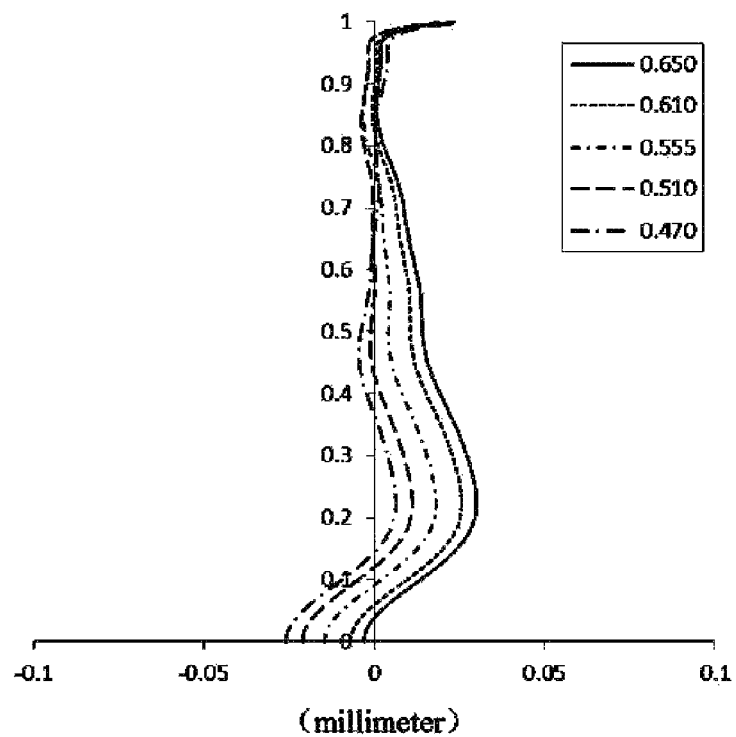
FIGS. 10A-10D show a longitudinal aberration curve, an astigmatism curve, a distortion curve and a lateral color curve of an optical imaging lens according to Embodiment 5 respectively.
Figure 10B:
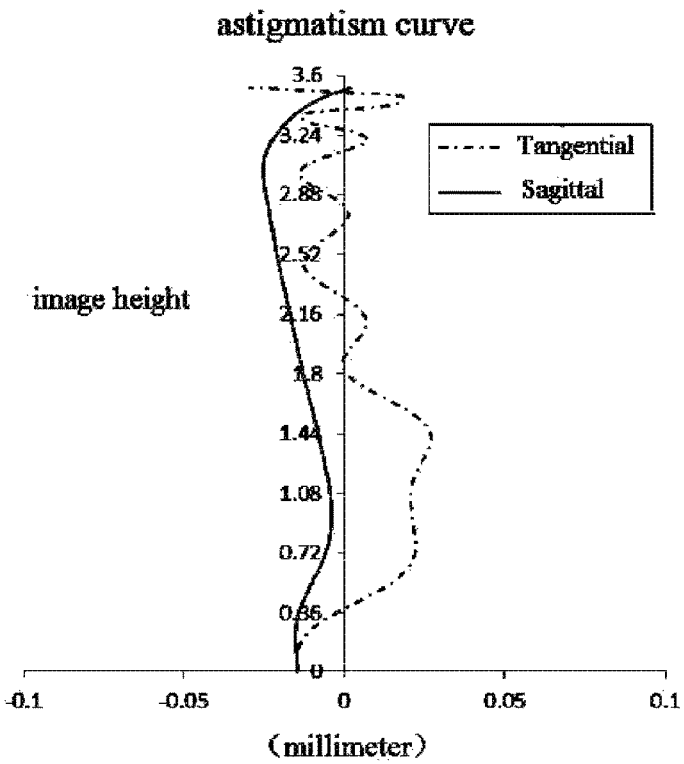
Figure 10C:
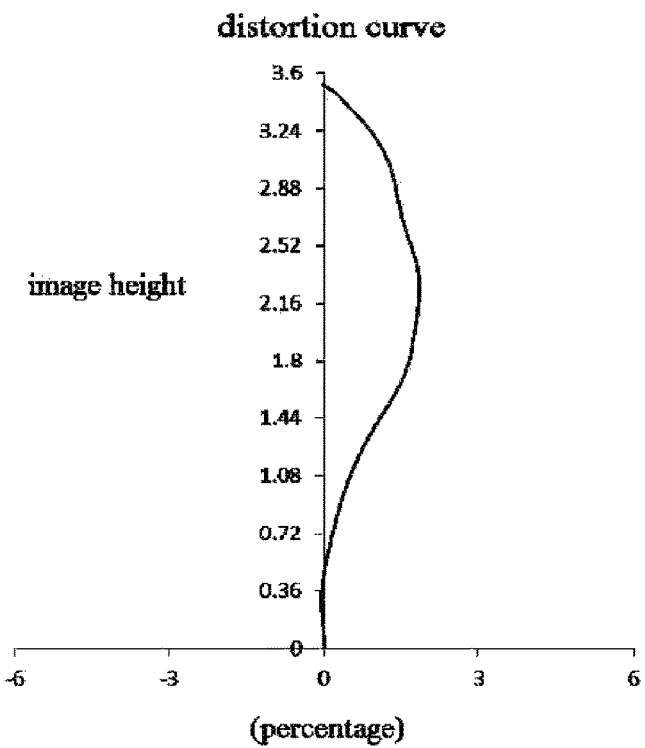
Figure 10D:
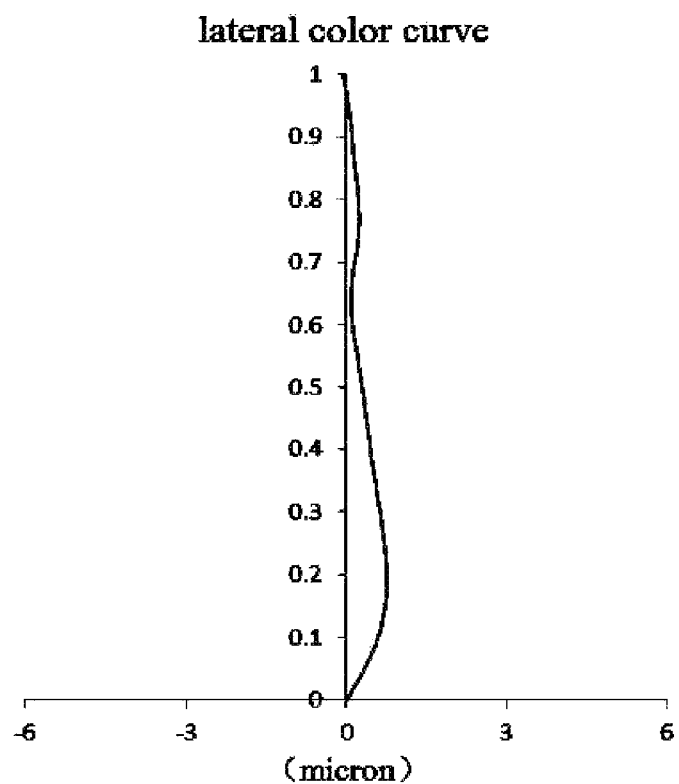

FIG. 10A shows a longitudinal aberration curve of the optical imaging lens of Embodiment 5, which represents deviation of a convergence focal point after light with different wavelengths passes through the lens. FIG. 10B shows an astigmatism curve of the optical imaging lens of Embodiment 5, which represents a curvature of tangential image surface and a curvature of sagittal image surface. FIG. 10C shows a distortion curve of the optical imaging lens of Embodiment 5, which represents distortion magnitude values corresponding to different image heights. FIG. 10D shows a lateral color curve of the optical imaging lens of Embodiment 5, which represents deviation of different image heights on the imaging surface after the light passes through the lens. According to FIGS. 10A-10D, it can be seen that the optical imaging lens provided in Embodiment 5 may achieve good imaging quality.

Embodiment 6

Figure 11:
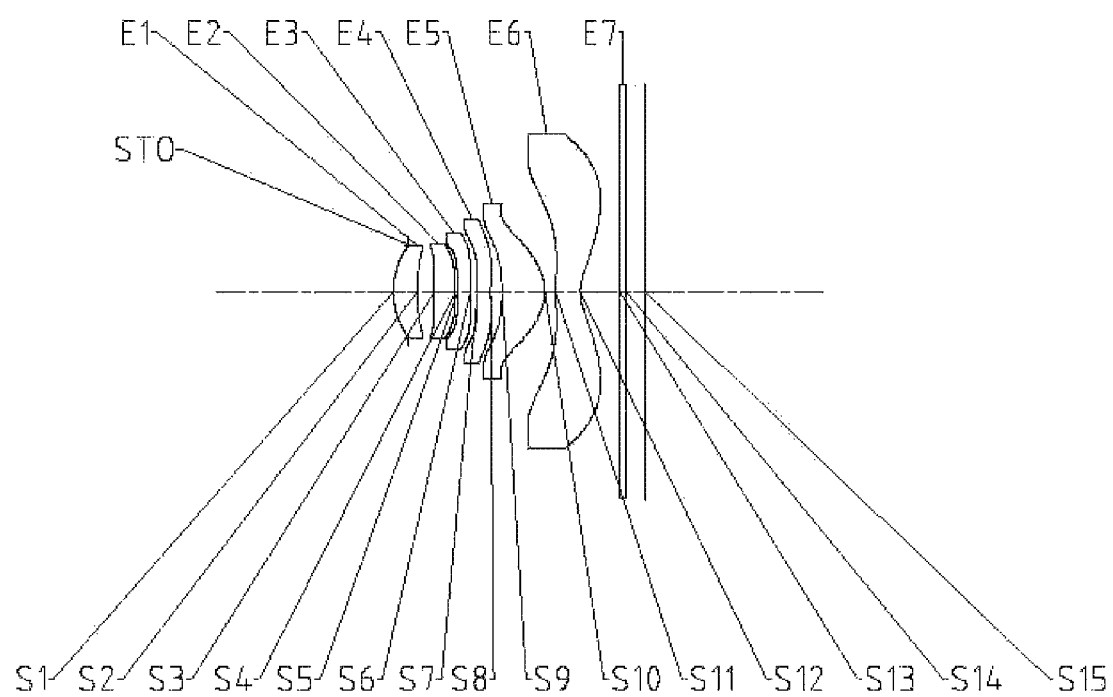
FIG. 11 shows a structural schematic diagram of an optical imaging lens according to Embodiment 6 of the disclosure.

An optical imaging lens according to Embodiment 6 of the disclosure is described below with reference to FIGS. 11-12D. FIG. 11 shows a structural schematic diagram of an optical imaging lens according to Embodiment 6 of the disclosure.

As shown in FIG. 11, the optical imaging lens sequentially includes, from an object side to an image side along an optical axis, a diaphragm STO, a first lens E1, a second lens E2, a third lens E3, a fourth lens E4, a fifth lens E5 and a sixth lens E6.

The first lens E1 has a positive refractive power, an object-side surface S1 thereof is a convex surface, and an image-side surface S2 thereof is a concave surface. The second lens E2 has a positive refractive power, an object-side surface S3 thereof is a concave surface, and an image-side surface S4 thereof is a convex surface. The third lens E3 has a negative refractive power, an object-side surface S5 thereof is a concave surface, and an image-side surface S6 thereof is a convex surface. The fourth lens E4 has a negative refractive power, an object-side surface S7 thereof is a concave surface, and an image-side surface S8 thereof is a concave surface. The fifth lens E5 has a positive refractive power, an object-side surface S9 thereof is a concave surface, and an image-side surface S10 thereof is a convex surface. The sixth lens E6 has a negative refractive power, an object-side surface S11 thereof is a convex surface, and an image-side surface S12 thereof is a concave surface. An optical filter E7 has an object-side surface S13 and an image-side surface S14. The optical imaging lens has an imaging surface S15. Light from an object sequentially penetrates through each of the surfaces S1 to S14 and is finally imaged on the imaging surface S15.

In Embodiment 6, a value of a total effective focal length f of the optical imaging lens is 3.06 mm, TTL is a distance from an object-side surface S1 of the first lens E1 to an imaging surface S15 of the optical imaging lens on the optical axis, and a value of TTL is 4.26 mm, and ImgH is a half the diagonal length of an effective pixel area on the imaging surface S15 of the optical imaging lens, and a value of ImgH is 3.53 mm.

Table 11 shows a table of basic parameters the optical imaging lens of Embodiment 6, wherein the units of the curvature radius, the thickness/distance and the focal length are all millimeters (mm). Table 12 shows high-order coefficients applied to each aspherical mirror surface in Embodiment 6. A surface type of each aspherical surface may be defined by the formula (1) given in Embodiment 1.

TABLE 11

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | 350.0000 | | | | |
| STO | Spherical | Infinite | −0.2534 | | | | |
| S1 | Aspherical | 1.3611 | 0.4011 | 1.55 | 56.1 | 4.33 | −3.0339 |
| S2 | Aspherical | 2.8702 | 0.2879 | | | | 8.5303 |
| S3 | Aspherical | −49.1841 | 0.3557 | 1.55 | 56.1 | 8.14 | 90.0000 |
| S4 | Aspherical | −4.0870 | 0.0401 | | | | 0.0000 |
| S5 | Aspherical | −7.0391 | 0.2150 | 1.68 | 19.2 | −24.19 | 0.0000 |
| S6 | Aspherical | −12.4892 | 0.1236 | | | | −85.9770 |
| S7 | Aspherical | −30.3789 | 0.2180 | 1.67 | 20.4 | −7.21 | 89.3375 |
| S8 | Aspherical | 5.7357 | 0.1935 | | | | 0.0000 |
| S9 | Aspherical | −3.1522 | 0.7267 | 1.55 | 56.1 | 1.72 | 0.0000 |
| S10 | Aspherical | −0.7812 | 0.1817 | | | | −1.0000 |
| S11 | Aspherical | 3.3969 | 0.4150 | 1.54 | 55.7 | −1.82 | −92.7013 |
| S12 | Aspherical | 0.7275 | 0.6753 | | | | −4.5518 |
| S13 | Spherical | Infinite | 0.1100 | 1.52 | 64.2 | | |
| S14 | Spherical | Infinite | 0.3163 | | | | |
| S15 | Spherical | Infinite | | | | | |

TABLE 12

| Surface number | A4 | A6 | A8 | A10 | A12 | A14 |
|---|---|---|---|---|---|---|
| S1 | 6.2610E−02 | 3.5361E+00 | −7.0478E+01 | 8.9714E+02 | −7.7146E+03 | 4.6417E+04 |
| S2 | −2.9116E−02 | −1.3942E−01 | 1.2279E+00 | −7.1182E+00 | −9.6989E+01 | 2.1731E+03 |
| S3 | −1.5697E−01 | 1.6159E+00 | −2.6165E+01 | 2.5267E+02 | −1.6074E+03 | 6.8863E+03 |
| S4 | 2.3541E−01 | −3.8577E+00 | −5.6030E+00 | 4.1587E+02 | −4.5720E+03 | 2.8768E+04 |
| S5 | 4.0778E−01 | −3.6824E+00 | −1.3804E+01 | 3.9094E+02 | −3.3385E+03 | 1.6742E+04 |
| S6 | 4.6020E−01 | −3.7691E+00 | 1.7409E+01 | −5.8883E+01 | 1.2222E+02 | −5.5255E+01 |
| S7 | 1.4418E−02 | −2.5714E+00 | 1.4221E+01 | −5.6922E+01 | 1.7698E+02 | −4.3054E+02 |
| S8 | −1.8378E−01 | −9.7108E−01 | 4.2291E+00 | −8.5582E+00 | 4.1318E−01 | 5.1665E+01 |
| S9 | 5.0631E−03 | −6.3132E−01 | 1.7067E+00 | −2.3827E+00 | −2.0379E+00 | 1.9802E+01 |
| S10 | 2.5563E−01 | −4.5001E−01 | 9.4334E−01 | −3.8611E+00 | 1.4487E+01 | −3.5990E+01 |
| S11 | −2.5196E−01 | 2.7646E−01 | −1.8234E−01 | 3.6157E−02 | 2.3612E−02 | −1.1117E−04 |
| S12 | −2.4201E−01 | 3.5708E−01 | −4.1166E−01 | 3.5161E−01 | −2.2244E−01 | 1.0433E−01 |

TABLE 12-continued

| Surface number | A16 | A18 | A20 |
|---|---|---|---|
| S1 | −1.9976E+05 | 6.2183E+05 | −1.4015E+06 |
| S2 | −1.9656E+04 | 1.0648E+05 | −3.7822E+05 |
| S3 | −1.9977E+04 | 3.8654E+04 | −4.7738E+04 |
| S4 | −1.1920E+05 | 3.3895E+05 | −6.6641E+05 |
| S5 | −5.3751E+04 | 1.0834E+05 | −1.1508E+05 |
| S6 | −5.3888E+02 | 1.9266E+03 | −3.4659E+03 |
| S7 | 8.1476E+02 | −1.1905E+03 | 1.3163E+03 |
| S8 | −1.6490E+02 | 2.8820E+02 | −3.2559E+02 |
| S9 | −4.8791E+01 | 6.8081E+01 | −6.0141E+01 |
| S10 | 5.9386E+01 | −6.6860E+01 | 5.2194E+01 |
| S11 | −2.4390E−02 | 2.1443E−02 | −9.6246E−03 |
| S12 | −3.6336E−02 | 9.3913E−03 | −1.7907E−03 |

Figure 12A:
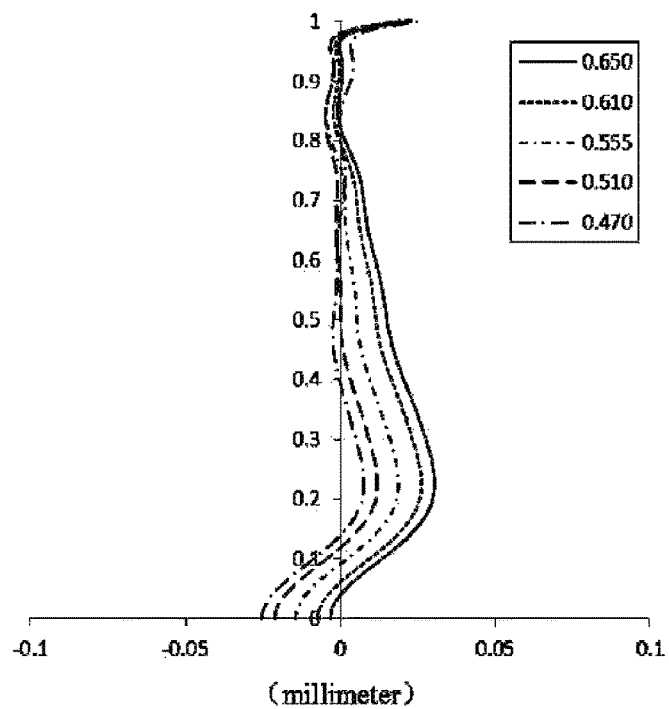
FIGS. 12A-12D show a longitudinal aberration curve, an astigmatism curve, a distortion curve and a lateral color curve of an optical imaging lens according to Embodiment 6 respectively.
Figure 12B:
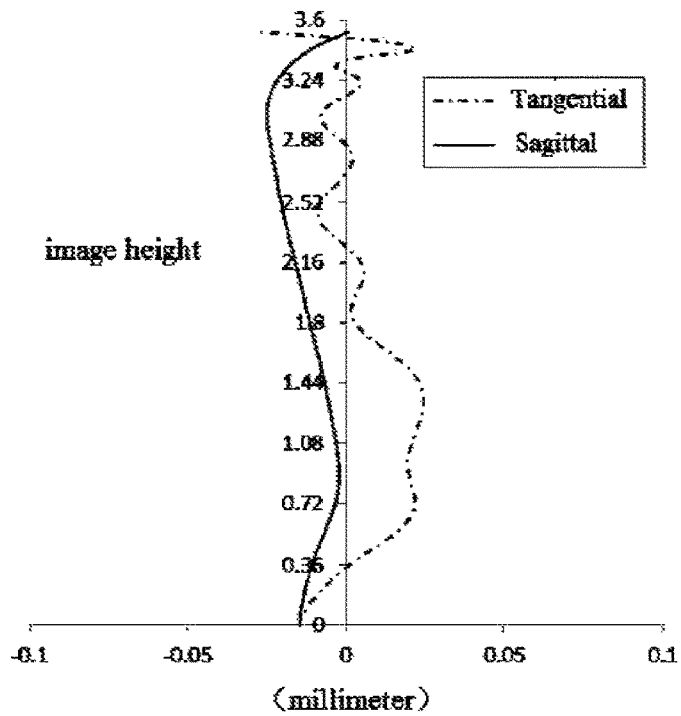
Figure 12C:
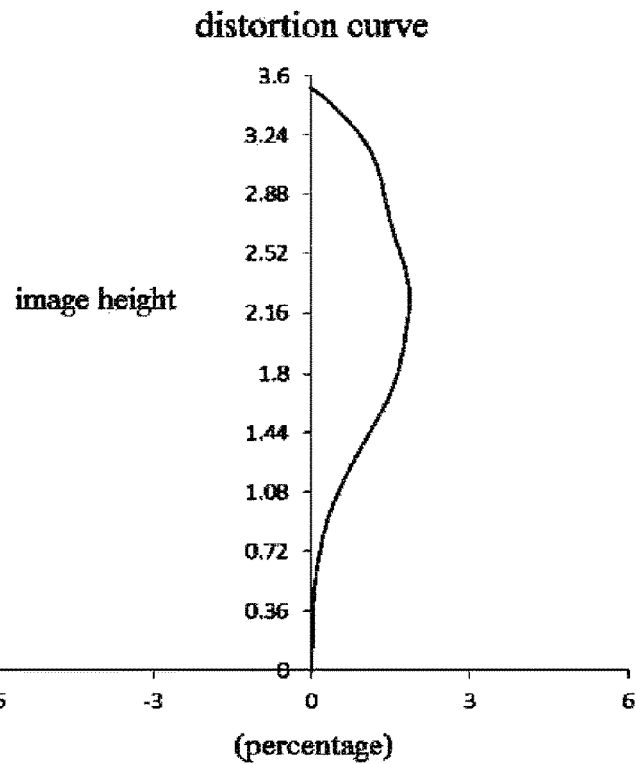
Figure 12D:
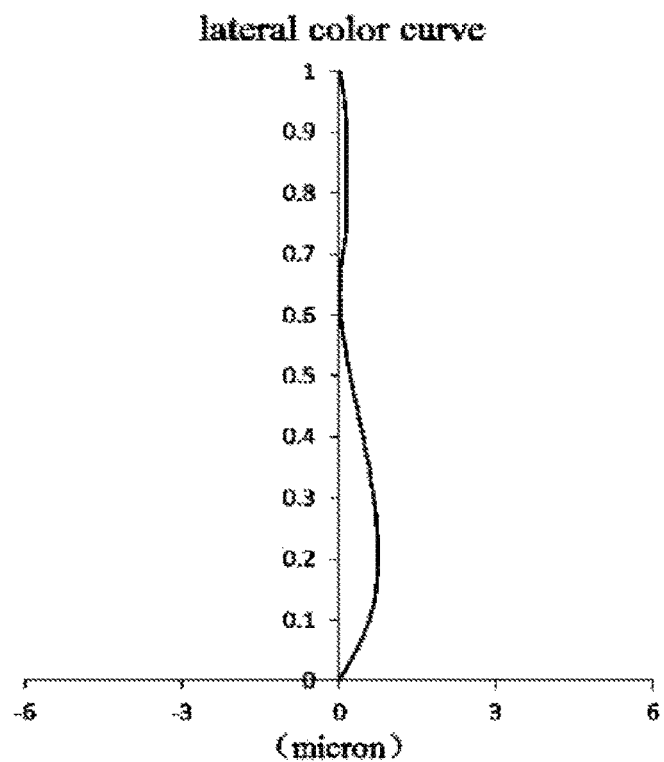

FIG. 12A shows a longitudinal aberration curve of the optical imaging lens of Embodiment 6, which represents deviation of a convergence focal point after light with different wavelengths passes through the lens. FIG. 12B shows an astigmatism curve of the optical imaging lens of Embodiment 6, which represents a curvature of tangential image surface and a curvature of sagittal image surface. FIG. 12C shows a distortion curve of the optical imaging lens of Embodiment 6, which represents distortion magnitude values corresponding to different image heights. FIG. 12D shows a lateral color curve of the optical imaging lens of Embodiment 6, which represents deviation of different image heights on the imaging surface after the light passes through the lens. According to FIGS. 12A-12D, it can be seen that the optical imaging lens provided in Embodiment 6 may achieve good imaging quality.

Embodiment 7

Figure 13:
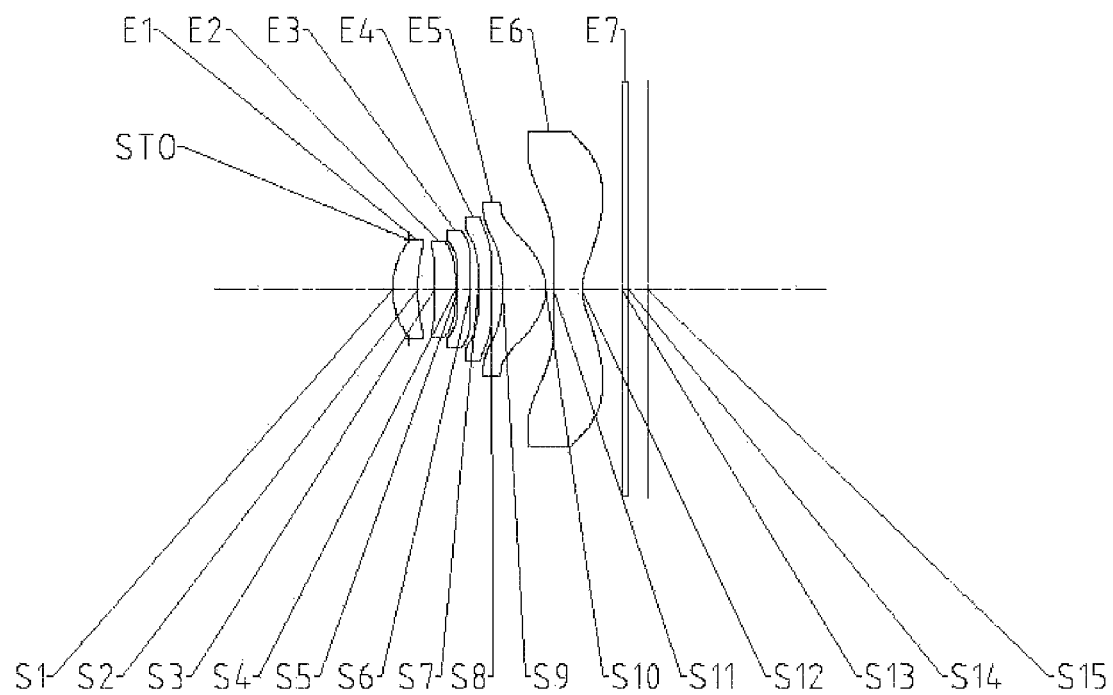
FIG. 13 shows a structural schematic diagram of an optical imaging lens according to Embodiment 7 of the disclosure.

An optical imaging lens according to Embodiment 7 of the disclosure is described below with reference to FIGS. 13-14D. FIG. 13 shows a structural schematic diagram of an optical imaging lens according to Embodiment 7 of the disclosure.

As shown in FIG. 13, the optical imaging lens sequentially includes, from an object side to an image side along an optical axis, a diaphragm STO, a first lens E1, a second lens E2, a third lens E3, a fourth lens E4, a fifth lens E5 and a sixth lens E6.

The first lens E1 has a positive refractive power, an object-side surface S1 thereof is a convex surface, and an image-side surface S2 thereof is a concave surface. The second lens E2 has a positive refractive power, an object-side surface S3 thereof is a concave surface, and an image-side surface S4 thereof is a convex surface. The third lens E3 has a negative refractive power, an object-side surface S5 thereof is a concave surface, and an image-side surface S6 thereof is a convex surface. The fourth lens E4 has a negative refractive power, an object-side surface S7 thereof is a concave surface, and an image-side surface S8 thereof is a concave surface. The fifth lens E5 has a positive refractive power, an object-side surface S9 thereof is a concave surface, and an image-side surface S10 thereof is a convex surface. The sixth lens E6 has a negative refractive power, an object-side surface S11 thereof is a convex surface, and an image-side surface S12 thereof is a concave surface. An optical filter E7 has an object-side surface S13 and an image-side surface S14. The optical imaging lens has an imaging surface S15. Light from an object sequentially penetrates through each of the surfaces S1 to S14 and is finally imaged on the imaging surface S15.

In Embodiment 7, a value of a total effective focal length f of the optical imaging lens is 3.06 mm, TTL is a distance from an object-side surface S1 of the first lens E1 to an imaging surface S15 of the optical imaging lens on the optical axis, and a value of TTL is 4.31 mm, and ImgH is a half the diagonal length of an effective pixel area on the imaging surface S15 of the optical imaging lens, and a value of ImgH is 3.53 mm.

Table 13 is a table of basic parameters the optical imaging lens of Embodiment 7, wherein the units of the curvature radius, the thickness/distance and the focal length are all millimeters (mm). Table 14 shows high-order coefficients applied to each aspherical mirror surface in Embodiment 7. A surface type of each aspherical surface may be defined by the formula (1) given in Embodiment 1.

TABLE 13

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | 350.0000 | | | | |
| STO | Spherical | Infinite | −0.2769 | | | | |
| S1 | Aspherical | 1.3955 | 0.4214 | 1.55 | 56.1 | 4.44 | −3.1671 |
| S2 | Aspherical | 2.9357 | 0.2837 | | | | 8.9197 |
| S3 | Aspherical | −51.9489 | 0.3552 | 1.55 | 56.1 | 9.58 | 90.0000 |
| S4 | Aspherical | −4.7626 | 0.0400 | | | | 0.0000 |
| S5 | Aspherical | −12.2443 | 0.2150 | 1.68 | 19.2 | −44.33 | 0.0000 |
| S6 | Aspherical | −20.8181 | 0.1300 | | | | −60.8377 |
| S7 | Aspherical | −38.8600 | 0.2180 | 1.67 | 20.4 | −8.23 | 90.0000 |
| S8 | Aspherical | 6.4056 | 0.1938 | | | | 0.0000 |
| S9 | Aspherical | −2.8345 | 0.7300 | 1.55 | 56.1 | 1.75 | 0.0000 |
| S10 | Aspherical | −0.7810 | 0.1308 | | | | −1.0000 |
| S11 | Aspherical | 3.5924 | 0.4792 | 1.54 | 55.7 | −1.87 | −71.7666 |

TABLE 13-continued

| Surface number | Surface type | Curvature radius | Thickness/ distance | Material Refractive index | Abbe number | Focal length | Conic coefficient |
|---|---|---|---|---|---|---|---|
| S12 | Aspherical | 0.7490 | 0.6809 | | | | −4.6349 |
| S13 | Spherical | Infinite | 0.1100 | 1.52 | 64.2 | | |
| S14 | Spherical | Infinite | 0.3220 | | | | |
| S15 | Spherical | Infinite | | | | | |

TABLE 14

| Surface number | A4 | A6 | A8 | A10 | A12 | A14 |
|---|---|---|---|---|---|---|
| S1 | 8.1326E−02 | 2.2532E+00 | −3.8318E+01 | 4.1160E+02 | −2.9399E+03 | 1.4379E+04 |
| S2 | −1.0134E−02 | −1.1219E+00 | 2.7893E+01 | −4.4667E+02 | 4.6659E+03 | −3.3329E+04 |
| S3 | −1.7354E−01 | 2.1288E+00 | −3.5676E+01 | 3.5803E+02 | −2.3482E+03 | 1.0310E+04 |
| S4 | 1.0205E−01 | −4.0940E+00 | 1.4713E+01 | 8.6203E+01 | −1.4805E+03 | 9.9649E+03 |
| S5 | 1.9104E−01 | −6.0490E−01 | −6.6599E+01 | 1.0774E+03 | −9.5877E+03 | 5.7027E+04 |
| S6 | 3.3882E−01 | −1.8189E+00 | −3.1147E+01 | 8.6607E+01 | −5.8369E+02 | 2.3567E+03 |
| S7 | 1.1486E−02 | −1.9980E+00 | 1.0811E+01 | −5.0922E+01 | 2.0295E+02 | −6.1699E+02 |
| S8 | −1.3393E−01 | −8.9677E−01 | 4.2061E+00 | −1.5861E+01 | 5.3245E+01 | −1.4753E+02 |
| S9 | 1.1750E−02 | −4.1176E−02 | −3.7029E+00 | 2.6711E+01 | −1.0566E+02 | 2.6956E+02 |
| S10 | 2.6337E−01 | −5.1151E−01 | 1.7717E+00 | −8.8133E+00 | 3.1271E+01 | −7.2682E+01 |
| S11 | −2.4680E−01 | 3.9024E−01 | −6.4098E−01 | 9.0808E−01 | −1.0005E+00 | 8.1930E−01 |
| S12 | −2.1031E−01 | 3.0476E−01 | −3.6250E−01 | 3.2303E−01 | −2.1233E−01 | 1.0276E−01 |

| Surface number | A16 | A18 | A20 |
|---|---|---|---|
| 31 | −4.8919E+04 | 1.1598E+05 | −1.8868E+05 |
| S2 | 1.6759E+05 | −6.0290E+05 | 1.5586E+06 |
| S3 | −3.0483E+04 | 5.9827E+04 | −7.4648E+04 |
| 34 | −4.1394E+04 | 1.1533E+05 | −2.1955E+05 |
| 35 | −2.3992E+05 | 7.2963E+05 | −1.6119E+06 |
| 36 | −6.4276E+03 | 1.2221E+04 | −1.6216E+04 |
| S7 | 1.3604E+03 | −2.1444E+03 | 2.3864E+03 |
| 38 | 3.1916E+02 | −5.2031E+02 | 6.2021E+02 |
| 39 | −4.6035E+02 | 5.3444E+02 | −4.2229E+02 |
| S10 | 1.1397E+02 | −1.2343E+02 | 9.3337E+01 |
| S11 | −4.9185E−01 | 2.1538E−01 | −6.8338E−02 |
| S12 | −3.6716E−02 | 9.6974E−03 | −1.8846E−03 |

Figure 14A:
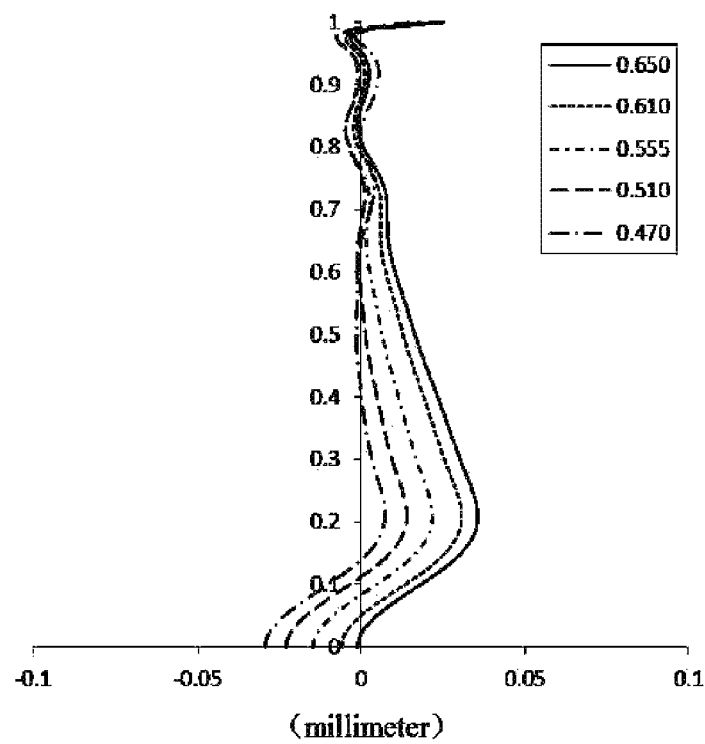
FIGS. 14A-14D show a longitudinal aberration curve, an astigmatism curve, a distortion curve and a lateral color curve of an optical imaging lens according to Embodiment 7 respectively.
Figure 14B:
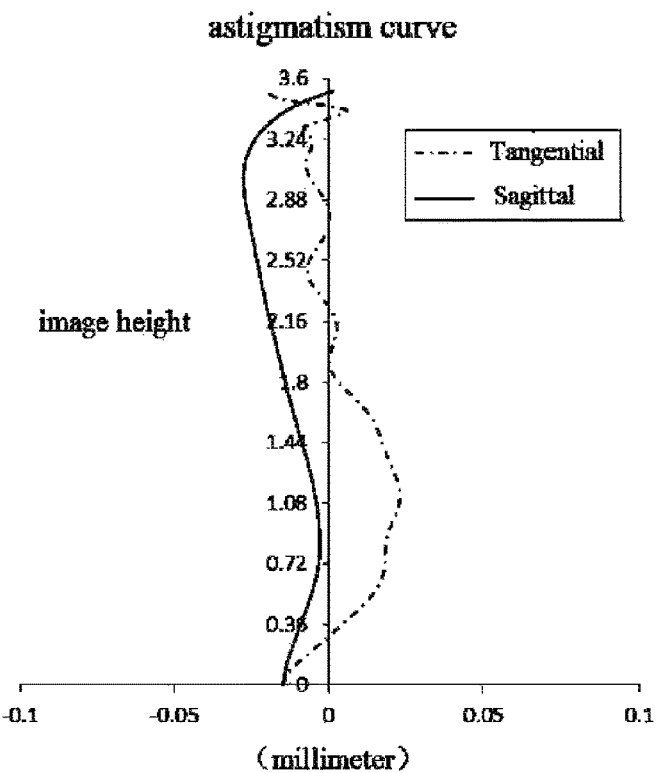
Figure 14C:
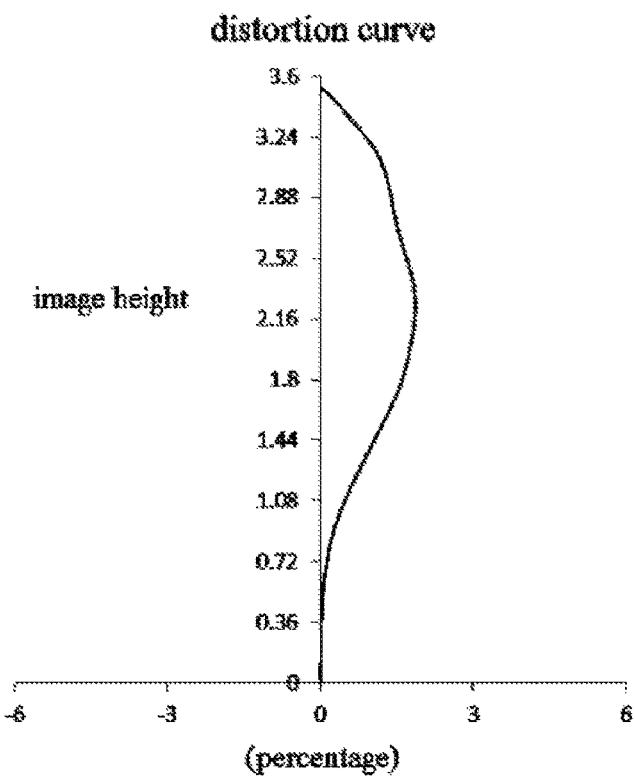
Figure 14D:
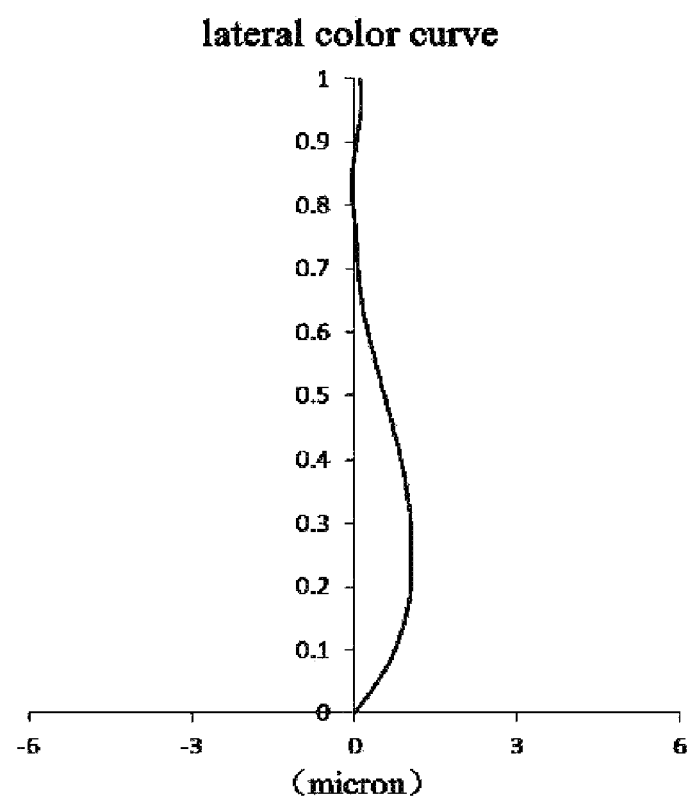

FIG. 14A shows a longitudinal aberration curve of the optical imaging lens of Embodiment 7, which represents deviation of a convergence focal point after light with different wavelengths passes through the lens, FIG. 14B shows an astigmatism curve of the optical imaging lens of Embodiment 7, which represents a curvature of tangential image surface and a curvature of sagittal image surface. FIG. 14C shows a distortion curve of the optical imaging lens of Embodiment 7, which represents distortion magnitude values corresponding to different image heights. FIG. 14D shows a lateral color curve of the optical imaging lens of Embodiment 7, which represents deviation of different image heights on the imaging surface after the light passes through the lens. According to FIGS. 14A-14D, it can be seen that the optical imaging lens provided in Embodiment 7 may achieve good imaging quality.

From the above, Embodiment 1 to Embodiment 7 satisfy a relationship shown in Table 15 respectively.

TABLE 15

| Conditional expression/Embodiment | 1 | 2 | 3 | 4 | 5 | 6 | 7 |
|---|---|---|---|---|---|---|---|
| TTL/ImgH | 1.23 | 1.23 | 1.22 | 1.19 | 1.20 | 1.21 | 1.22 |
| ImgH/f | 1.13 | 1.15 | 1.15 | 1.17 | 1.16 | 1.15 | 1.15 |
| f2/(f1 + f5) | 1.34 | 1.17 | 1.24 | 1.35 | 1.36 | 1.35 | 1.55 |
| f3/(R5 + R6) | 0.19 | 0.26 | 1.35 | 1.17 | 1.27 | 1.24 | 1.34 |
| f6/R12 | −1.84 | −1.91 | −2.61 | −2.83 | −2.57 | −2.50 | −2.50 |
| T34/CT3 | 0.47 | 0.46 | 0.56 | 0.58 | 0.56 | 0.57 | 0.60 |
| CT5/(T56 + CT6) | 0.94 | 1.11 | 1.17 | 1.13 | 1.20 | 1.22 | 1.20 |
| DT12/DT32 | 0.74 | 0.74 | 0.75 | 0.74 | 0.76 | 0.77 | 0.78 |
| f23/f4 | −1.54 | −1.62 | −1.42 | −1.43 | −1.69 | −1.72 | −1.49 |
| CT5/ET5 | 2.64 | 2.59 | 2.48 | 2.41 | 2.49 | 2.53 | 2.54 |
| (SAG31 + SAG32)/f × 10 | −1.00 | −1.08 | −1.30 | −1.14 | −1.18 | −1.17 | −1.09 |
| f/EPD | 2.12 | 2.12 | 2.12 | 2.10 | 1.94 | 1.94 | 1.84 |

The disclosure also provides an imaging device, wherein the electronic photosensitive element can be a Charge Coupled Device (CCD) or a Complementary Metal Oxide Semiconductor (CMOS). The imaging device may be a stand-alone imaging device, such as a digital camera, or an imaging module integrated on mobile electronic equipment, such as a cell phone. The imaging device is equipped with the optical imaging lens described above.

The above description is only description about the preferred embodiments of the disclosure and adopted technical principles. Those skilled in the art should know that the scope of protection involved in the disclosure is not limited to the technical solutions formed by specifically combining the technical features and should also cover other technical solutions formed by freely combining the technical features or equivalent features thereof without departing from the inventive concept, for example, technical solutions formed by mutually replacing the features and (but not limited to) the technical features with similar functions disclosed in the disclosure.

What is claimed is:

1. An optical imaging lens, sequentially comprising from an object side to an image side along an optical axis:
    a first lens has a positive refractive power,
    a second lens has a positive refractive power;
    a third lens, an object-side surface thereof is a concave surface, and an image-side surface thereof is a convex surface;
    a fourth lens;
    a fifth lens has a positive refractive power;
    a sixth lens has a negative refractive power, and
    TTL is a distance from an object-side surface of the first lens to an imaging surface of the optical imaging lens on the optical axis, ImgH is a half the diagonal length of an effective pixel area on the imaging surface of the optical imaging lens, and TTL and ImgH satisfy TTL/ImgH<1.3; and
    TTL satisfies TTL<5.0 mm;
    wherein a spacing distance T34 of the third lens and the fourth lens on the optical axis and a center thickness CT3 of the third lens on the optical axis satisfy 0.46≤T34/CT3<0.7;
    an effective focal length f3 of the third lens, a curvature radius R5 of the object-side surface of the third lens and a curvature radius R6 of the image-side surface of the third lens satisfy 1.17≤f3/(R5+R6)<1.4.

2. The optical imaging lens according to claim 1, wherein ImgH and a total effective focal length f of the optical imaging lens satisfy 1.0<ImgH/f<1.3.

3. The optical imaging lens according to claim 1, wherein an effective focal length f1 of the first lens, an effective focal length f2 of the second lens and an effective focal length f5 of the fifth lens satisfy 1.0<f2/(f1+f5)<1.6.

4. The optical imaging lens according to claim 1, wherein an effective focal length f6 of the sixth lens and a curvature radius R12 of an image-side surface of the sixth lens satisfy −2.9<f6/R12<−1.8.

5. The optical imaging lens according to claim 1, wherein a center thickness CT5 of the fifth lens on the optical axis, a spacing distance T56 of the fifth lens and the sixth lens on the optical axis and a center thickness CT6 of the sixth lens on the optical axis satisfy 0.8<CT5/(T56+CT6)<1.3.

6. The optical imaging lens according to claim 1, wherein a combined focal length f23 of the second lens and the third lens and an effective focal length f4 of the fourth lens meet −1.8<f23/f4<−1.4.

7. The optical imaging lens according to claim 1, wherein a total effective focal length f of the optical imaging lens and an entrance pupil diameter (EPD) of the optical imaging lens satisfy 1.8<f/EPD<2.2.

8. An optical imaging lens, sequentially comprising from an object side to an image side along an optical axis:
    a first lens has a positive refractive power,
    a second lens has a positive refractive power;
    a third lens, an object-side surface thereof is a concave surface, and an image-side surface thereof is a convex surface;
    a fourth lens;
    a fifth lens has a positive refractive power;
    a sixth lens has a negative refractive power; and
    TTL is a distance from an object-side surface of the first lens to an imaging surface of the optical imaging lens on the optical axis, ImgH is a half the diagonal length of an effective pixel area on the imaging surface of the optical imaging lens, and TTL and ImgH satisfy TTL/ImgH<1.3; and
    an effective focal length f1 of the first lens, an effective focal length f2 of the second lens and an effective focal length f5 of the fifth lens satisfy 1.0<f2/(f1+f5)<1.6;
    wherein a spacing distance T34 of the third lens and the fourth lens on the optical axis and a center thickness CT3 of the third lens on the optical axis satisfy 0.46≤T34/CT3<0.7;
    wherein an effective focal length f3 of the third lens, a curvature radius R5 of the object-side surface of the third lens and a curvature radius R6 of the image-side surface of the third lens satisfy 1.17≤f3/(R5+R6)<1.4.

9. The optical imaging lens according to claim 8, wherein ImgH and a total effective focal length f of the optical imaging lens satisfy 1.0<ImgH/f<1.3.

10. The optical imaging lens according to claim 9, wherein TTL satisfies TTL<5.0 mm.

11. The optical imaging lens according to claim 8, wherein an effective focal length f6 of the sixth lens and a curvature radius R12 of an image-side surface of the sixth lens satisfy −2.9<f6/R12<−1.8.

12. The optical imaging lens according to claim 8, wherein a center thickness CT5 of the fifth lens on the optical axis, a spacing distance T56 of the fifth lens and the sixth lens on the optical axis and a center thickness CT6 of the sixth lens on the optical axis satisfy 0.8<CT5/(T56+CT6)<1.3.

* * * * *